United States Patent
Srikantiah et al.

(10) Patent No.: US 12,248,365 B2
(45) Date of Patent: Mar. 11, 2025

(54) ERROR HANDLING FOR A MIXED MODE RFFE BUS

(71) Applicant: QUALCOMM Incorporated, San Diego, CA (US)

(72) Inventors: Umesh Srikantiah, San Diego, CA (US); Lalan Jee Mishra, Escondido, CA (US); Richard Dominic Wietfeldt, San Diego, CA (US); Boris Alpin, San Diego, CA (US); Francesco Gatta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 18/183,833

(22) Filed: Mar. 14, 2023

(65) Prior Publication Data

US 2024/0311228 A1 Sep. 19, 2024

(51) Int. Cl.
*G06F 11/07* (2006.01)
*G06F 13/42* (2006.01)

(52) U.S. Cl.
CPC ...... *G06F 11/0793* (2013.01); *G06F 11/0757* (2013.01); *G06F 11/0772* (2013.01); *G06F 13/4291* (2013.01)

(58) Field of Classification Search
CPC ............. G06F 11/0793; G06F 11/0773; G06F 11/0767; G06F 13/4291
See application file for complete search history.

(56) References Cited

U.S. PATENT DOCUMENTS

| 2020/0081859 A1* | 3/2020 | Mishra | G06F 13/4054 |
| 2023/0167085 A1* | 6/2023 | Hicks | C07D 401/14 |
| | | | 514/309 |
| 2023/0171598 A1* | 6/2023 | Normann | H04W 8/18 |
| | | | 455/410 |

(Continued)

FOREIGN PATENT DOCUMENTS

WO 2020051299 A1 3/2020

OTHER PUBLICATIONS

Anonymous: "Manchester Code—Wikipedia, the Free Encyclopedia", Oct. 30, 2013, pp. 1-4, XP055192598.

(Continued)

*Primary Examiner* — Samir W Rizk
(74) *Attorney, Agent, or Firm* — Loza & Loza, LLP/Qualcomm

(57) ABSTRACT

A receiving circuit has a clock generator circuit, a synchronization circuit and a controller. The clock generator circuit is configured to generate a base clock signal with a base frequency. The synchronization circuit is configured to synchronize edges in the base clock signal with edges in a Manchester-encoded data signal received over a serial bus. The controller is configured to detect that a first pulse received from the serial bus has a duration corresponding to a pulse duration defined for a first type of sequence start condition that indicates a first type of transaction during which the Manchester-encoded data signal is received over the serial bus; configure a first timer to expire after a first timeout period; and ignore the first pulse when signaling consistent with the first type of sequence start condition has not been received before the first timer expires.

30 Claims, 18 Drawing Sheets

(56) References Cited

U.S. PATENT DOCUMENTS

| | | | |
|---|---|---|---|
| 2023/0267085 A1* | 8/2023 | Mishra | G06F 13/4291 710/110 |
| 2024/0196263 A1* | 6/2024 | Hedman | H04M 15/66 |

OTHER PUBLICATIONS

International Search Report and Written Opinion—PCT/US2024/013180—ISA/EPO—May 6, 2024.

* cited by examiner

ERROR HANDLING FOR A MIXED MODE RFFE BUS

TECHNICAL FIELD

The present disclosure relates generally to serial communication and, more particularly, to clock generation at receivers coupled to a communication bus that supports one-wire and two-wire peripheral devices.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus is operated in accordance with an Inter-Integrated Circuit (I2C bus or I2C) protocol. The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines.

In another example, the Radio Frequency Front-End (RFFE) interface defined by the MIPI Alliance provides a communication interface for controlling various radio frequency (RF) front-end devices, including power amplifiers (PAS), low-noise amplifiers (LNAs), antenna tuners, filters, sensors, power management devices, switches, etc. These devices may be collocated in a single IC device or provided in multiple IC devices. In another example, the system power management interface (SPMI) defined by the MIPI Alliance provides a hardware interface that may be implemented between baseband or application processors and peripheral components. In some implementations, the SPMI is deployed to support power management operations within a device.

The use of MIPI-defined serial buses in place of parallel buses can reduce the number of physical general-purpose input/output (GPIO) pins required to support communication between multiple devices. However, as device complexity increases, demand for GPIO pins also increases and there is demand for more simplified bus architectures, including bus architectures that support communication through a single GPIO pin and over a single wire. There is a related demand for error handling for communication over a single wire.

SUMMARY

Certain aspects of the disclosure provide systems, apparatus, methods and techniques related to error handling when data is transmitted over a single-wire serial bus. Clock signals generated at the receiver are synchronized to every transition in a Manchester-encoded signal that encodes a data bit. The single-wire serial bus may format datagrams in accordance with RFFE, SPMI or another standards-defined protocol.

In various aspects of the disclosure, a receiving circuit includes a clock generator circuit configured to generate a base clock signal with a base frequency, a synchronization circuit configured to synchronize edges in the base clock signal with edges in a Manchester-encoded data signal received over a serial bus, and a controller. The controller may be configured to detect that a first pulse received from the serial bus has a duration corresponding to a pulse duration defined for a first type of sequence start condition (SSC) that indicates a first type of transaction during which the Manchester-encoded data signal is received over the serial bus, configure a first timer to expire after a first timeout period, and ignore the first pulse when signaling consistent with the first type of SSC has not been received before the first timer expires.

In various aspects of the disclosure, a method of data communication includes configuring an oscillator to generate a base clock signal with a base frequency, configuring a synchronization circuit to synchronize edges in the base clock signal with edges in a Manchester-encoded data signal received over a serial bus, detecting that a first pulse received from the serial bus has a duration corresponding to a pulse duration defined for a first type of SSC that indicates a first type of transaction during which the Manchester-encoded data signal is received over the serial bus, configuring a first timer to expire after a first timeout period, and ignoring the first pulse when signaling consistent with the first type of SSC has not been received before the first timer expires.

In various aspects of the disclosure, a data communication apparatus includes means for generating a base clock signal with a base frequency, means for synchronizing edges in the base clock signal with edges in a Manchester-encoded data signal received over a serial bus, and means for determining whether a first pulse received from the serial bus indicates a first type of transaction during which the Manchester-encoded data signal is received over the serial bus. The means for determining whether the first pulse indicates the first type of transaction may be configured to determine whether the first pulse has a duration corresponding to a pulse duration defined for a first type of SSC and is followed in transmission by signaling consistent with the first type of SSC that is received before a first timeout period expires.

In various aspects of the disclosure, a processor-readable storage medium stores code thereon and the code, when executed by a processor in a processing circuit causes the processing circuit to configure an oscillator to generate a base clock signal with a base frequency, configure a synchronization circuit to synchronize edges in the base clock signal with edges in a Manchester-encoded data signal received over a serial bus, detect that a first pulse received from the serial bus has a duration corresponding to a pulse duration defined for a first type of SSC that indicates a first type of transaction during which the Manchester-encoded data signal is received over the serial bus, configure a first timer to expire after a first timeout period, and ignore the first pulse when signaling consistent with the first type of SSC has not been received before the first timer expires.

In one aspect, the pulse duration defined for the first type of SSC is greater than a pulse duration defined for a second type of transaction in which data is received over the serial bus in a data signal with a bus clock signal that defines timing of the data signal. The base clock signal may have a frequency that is a multiple of a frequency of the bus clock signal.

In one aspect, the signaling consistent with the first type of SSC comprises a synchronization pattern.

In one aspect, the controller is configured to ignore the first pulse by configuring a second timer to expire after a second timeout period, and cause one or more circuits in the clock generator circuit to enter an idle state when the second timer expires. The controller may be further configured to: restart the second timer when a transition in signaling state of the serial bus is detected before the second timer expires.

In certain aspects, the controller is further configured to receive Manchester-encoded data or command bits over the serial bus after determining that a second pulse received from the serial bus has a duration corresponding to the pulse duration defined for the first type of SSC, determine that an error has occurred during transmission or decoding of the Manchester-encoded data or command bits, configure a third timer to expire after a third timeout period, and cause one or more circuits in the clock generator circuit to enter an idle state when the third timer expires. The controller may be further configured to restart the third timer when a transition in signaling state of the serial bus is detected before the third timer expires. The Manchester-encoded data or command bits are received in a datagram configured in accordance with a Radio Frequency Front-End (RFFE) protocol.

DETAILED DESCRIPTION

Figure 1:
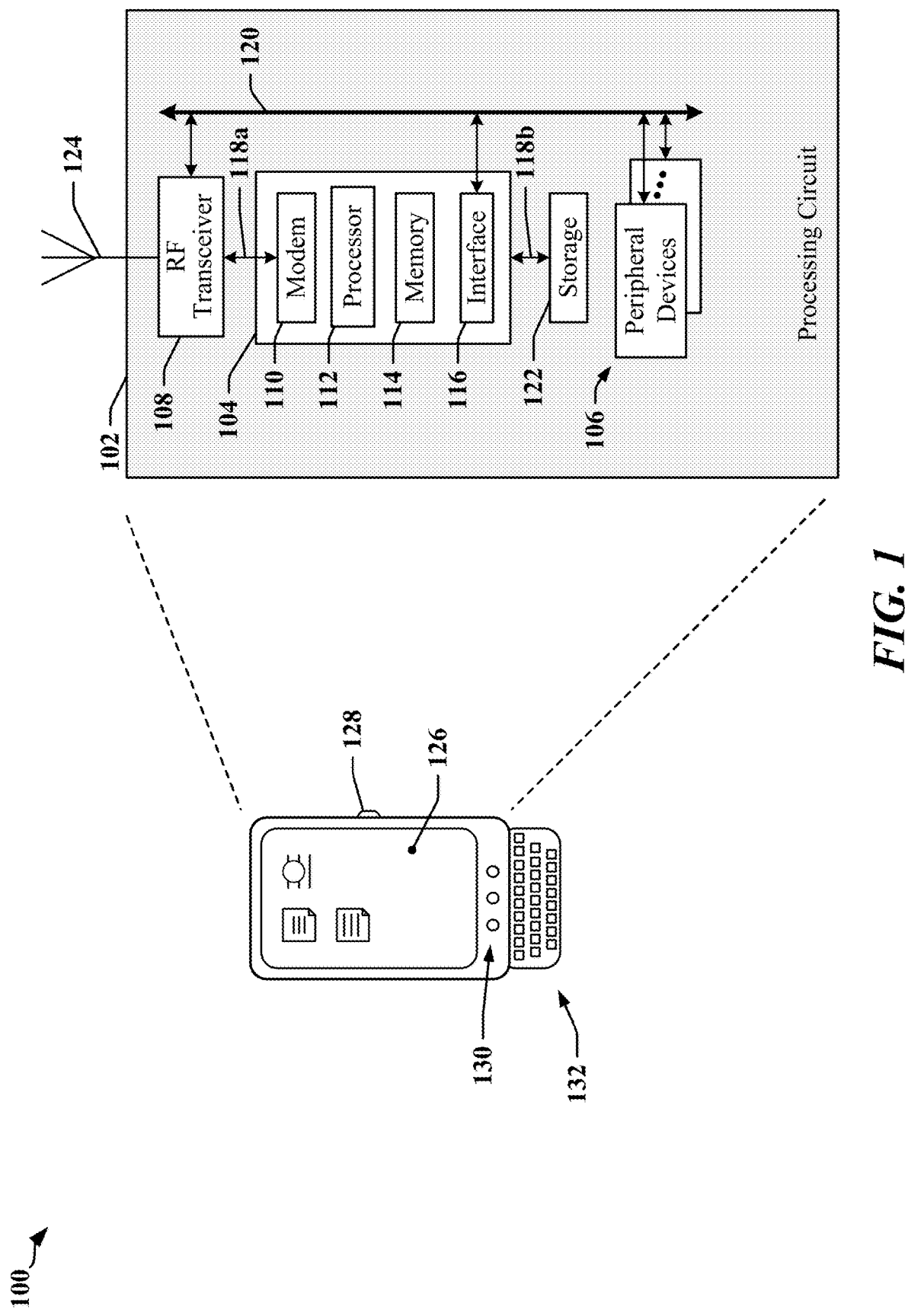
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to communication of digital signals that include transitions between two or more signaling states. For the purpose of this description, transitions between two signaling states in a digital signal may be referred to as edges. Transitions from a low voltage signaling state to a higher voltage signaling state may be referred to as a positive edge, a positive transition, a rising edge, a rising transition or a positive-transitioning edge. Transitions to a low voltage signaling state from a higher voltage signaling state may be referred to as a negative edge, a negative transition, a falling edge, a falling transition or a negative-transitioning edge.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a client device, a slave device, a subordinate device, a peripheral device or another term favored by standards defining the protocols implemented by the controlling device. For the purposes of this disclosure, a controlling device will be referred to as a host device and associated receiving devices will be referred to as subordinate devices.

Devices that include multiple SoCs and/or other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on general-purpose input/output (GPIO) pin availability and communication link throughput.

Certain aspects of the disclosure relate to techniques for communication over a single wire bus, using Manchester encoding and synchronization signaling that can be distinguished by devices coupled to the single wire bus. The synchronization signaling may be configured to enable receiving devices to synchronize clock signals generated in a device that is currently transmitting over the single wire bus. In one aspect, a host device may be adapted to format datagrams in accordance with RFFE or SPMI protocols. Receive clocks used to sample a Manchester-encoded signal can be resynchronized in every bit transmission interval, eliminating the possibility of accumulation of the effects of transmission errors on phase and frequency of the Manchester-encoded signal or on the receive clocks. Certain aspects if this disclosure address error handling techniques that are applicable to mixed mode serial buses, including two-wire serial buses that support communication with 1-wire and 2-wire peripheral devices.

In accordance with certain aspects of this disclosure, an oscillator in a peripheral device may be configured to generate a base clock signal with a base frequency. Edges in the base clock signal are synchronized with edges in a Manchester-encoded data signal received over a serial bus. Receiver circuits in the peripheral device can determine when a pulse received from the serial bus has a duration that matches or corresponds to a pulse duration defined for a first type of sequence start condition (SSC). The first type of SSC may indicate a first type of transaction during which the Manchester-encoded data signal is received over the serial bus using a single wire. Another type of SSC may indicate a second type of transaction in which data and clock signals are transmitted using both wires of the serial bus. A first timer may be configured to expire after a first timeout period, and the first pulse may be ignored when signaling consistent with the first type of SSC has not been received before the first timer expires.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode.

Examples of Apparatus that Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
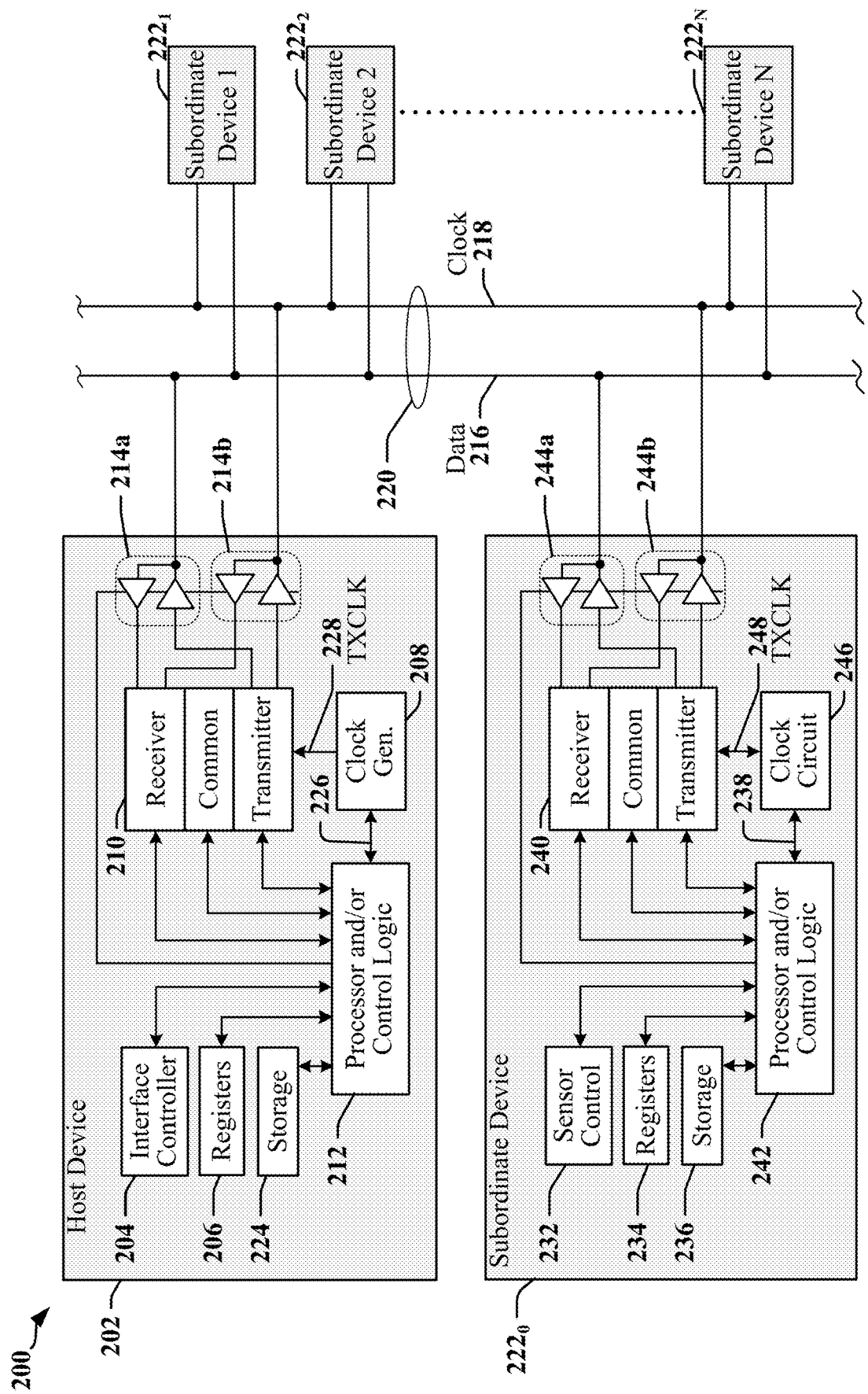
FIG. 2 illustrates a first example of an apparatus employing a data link that may be used to communicatively couple two or more devices.

FIG. 2 illustrates a first example of an apparatus 200 employing a data link that may be used to communicatively couple two or more devices. Here, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202. Certain types of bus can support multiple host devices 202.

In one example, a host device 202 may include an interface controller 204 that may manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

One or more devices $222_0$-$222_N$ may be configured to operate as a subordinate device. In some examples, a subordinate device may include circuits and modules that support a display, an image sensor, and/or circuits and modules that control and communicate with one or more sensors that measure environmental conditions. In one example, a device $222_0$ configured to operate as a subordinate device may provide a control function, module or circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one of the devices 202 and $222_0$-$222_N$ may be configured to operate as a host device and a subordinate device on the serial bus 220. Two or more of the devices 202 and $222_0$-$222_N$ may be configured to operate as a host device on the serial bus 220. The protocol selected to control operation of the serial bus 220 may define direct current (DC) characteristics affecting certain signal levels associated with the serial bus 220, and/or alternating current (AC) characteristics affecting certain timing aspects of signals transmitted on the serial bus 220. In various examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
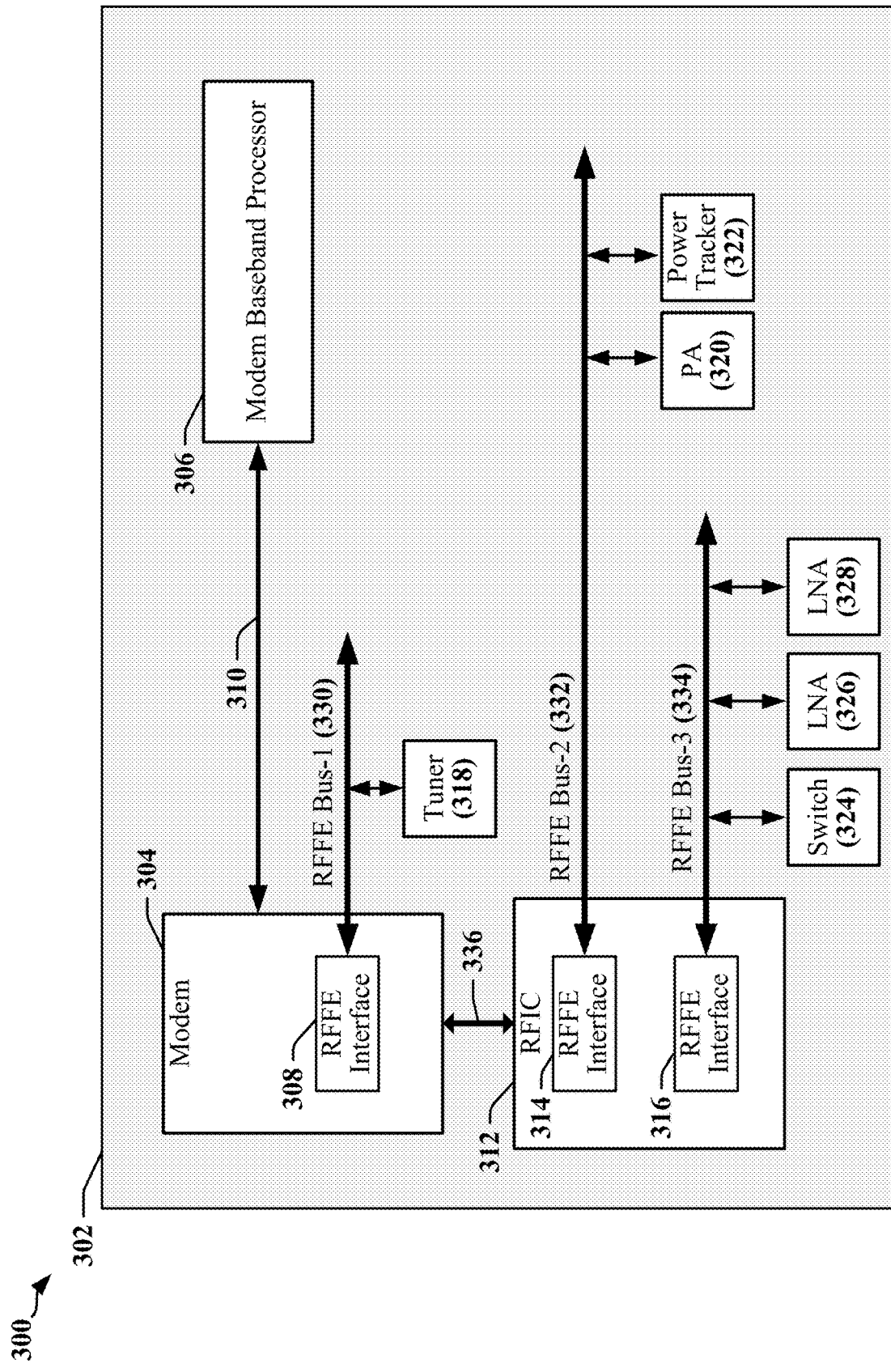
FIG. 3 illustrates a second example of an apparatus employing data links that may be used to communicatively couple two or more devices, including various radio frequency front-end devices.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices 318, 320, 322, 324, 326, 328. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 4:
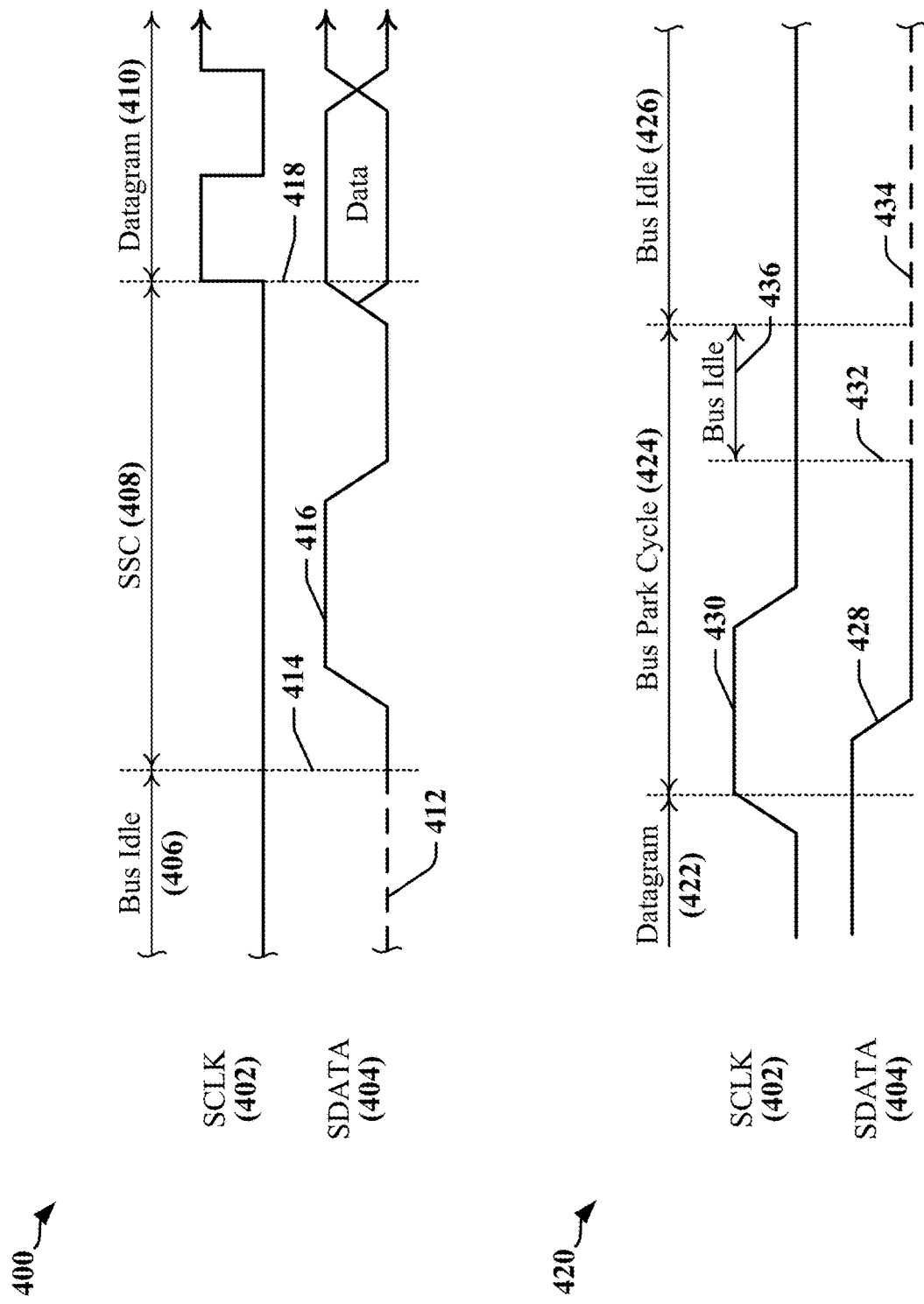
FIG. 4 includes timing diagrams that illustrate signaling transmitted to delineate the boundaries of RFFE and SPMI datagrams.

FIG. 4 includes timing diagrams 400, 420 that illustrate signaling that is transmitted to delineate the boundaries of datagrams transmitted in accordance with RFFE protocols. The timing diagrams 400, 420 show the relative timing of signals transmitted on a 2-wire serial bus that provides a clock signal on SCLK 402 and provides for exchange of data over SDATA 404. The first timing diagram 400 illustrates timing of a sequence start condition (SSC 408) that is transmitted to signal the start of a transaction such as the transmission of a datagram 410. The SSC 408 is transmitted when the serial bus is in an idle state 406. In the idle state 406, SCLK 402 is driven at full strength by a host device while subordinate devices coupled to the serial bus present a high impedance to SCLK 402. SCLK 402 is held in the low signaling state (here, at zero volts) by the host device. In the idle state 406, SDATA 404 is weakly driven by the host device or is held in the weakly driven low signaling state 412 using a keeper circuit or a weak pull-down circuit. A keeper circuit or a weak pull-down circuit may maintain the signaling state of SDATA 404, for example, when the host device has caused its line driver to enter a high impedance state and when no other device is driving SDATA 404. The weakly driven low signaling state 412 can easily be overcome by another line driver that can drive SDATA 404 at full strength.

In a master-driven SSC 408, the host device commences transmission of the SSC 408 at a first point in time 414 when it begins to drive SDATA 404 at full strength, initially at the low signaling state. The host device then provides a pulse 416 on SDATA 404 while continuing to drive SCLK 402 to the low signaling state. The pulse 416 has duration of at least one cycle of a clock signal provided on SCLK 402 during transmission of a datagram 410. At a second point in time 418, the host device commences transmission of clock pulses on SCLK 402, thereby providing the clock signal used to control or indicate timing of a datagram 410 transmitted on SDATA 404.

The second timing diagram 420 illustrates timing of a bus park cycle (the BPC 424) that may be transmitted to signal the termination of a datagram 422, for example. The BPC 424 is transmitted by providing a falling edge 428 on SDATA 404 while SCLK 402 is in a high signaling state 430. By protocol, transitions on SDATA 404 during transmission of the datagram 422 are permitted only while the clock signal is in the low signaling state, and the falling edge 428 that occurs while SCLK 402 is in the high signaling state 430 is interpreted as control signaling (i.e., the BPC 424). The falling edge 428 is provided by the host device driving SDATA 404 low at full strength. The host device then drives SCLK 402 low and continues to drive SCLK 402 at full strength through subsequent bus idle intervals 426, 436. After driving SCLK 402 low, the host device initiates a bus idle interval 436 at a time 432 when the host device causes its line driver to enter the high impedance state. While no other device is driving SDATA 404, SDATA 404 remains in the weakly driven low signaling state 434. The BPC 424 is terminated and the serial bus enters a bus idle interval 426 until the next datagram is ready for transmission.

In the various examples provided herein, the example of a 1-wire serial bus is described in which data and commands are configured in accordance with an RFFE protocol. However, the concepts are not limited to RFFE protocols and various aspects of this disclosure apply equally to I2C, I3C, SPI, SPMI and other standards-defined or proprietary protocols. The single line of the one-wire serial bus is used as a data line for bidirectional transmission of control and data signaling. According to certain aspects of this disclosure timing for communication between one-wire subordinate devices coupled to the serial bus may be embedded in data transmissions and control signaling may be provided to synchronize clock signals at the transmitter and receiver.

Figure 5:
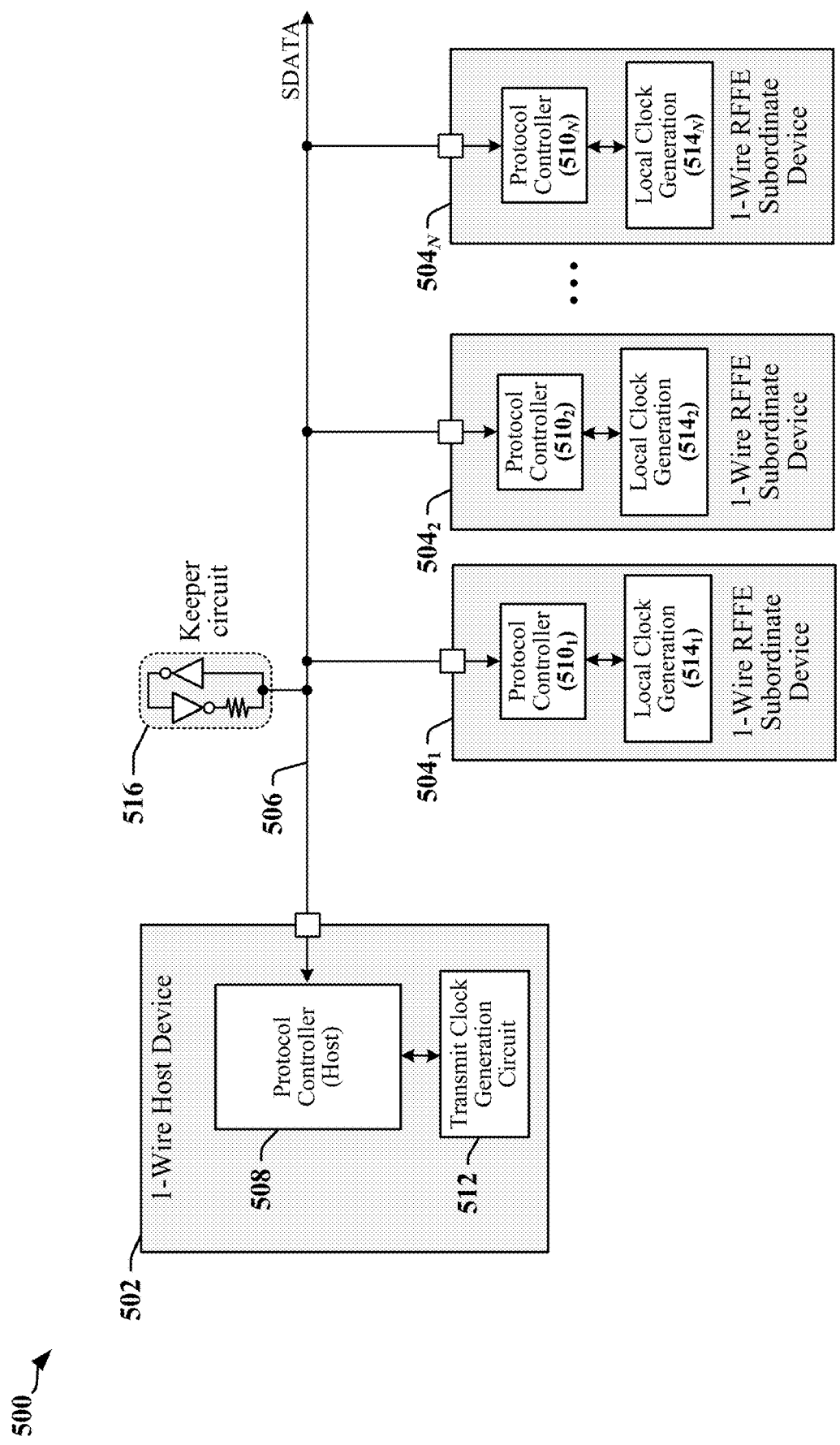
FIG. 5 illustrates a system in which a host device communicates with one or more one-wire subordinate devices in accordance with certain aspects disclosed herein.

FIG. 5 illustrates a system 500 in which a host device 502 communicates with one or more one-wire subordinate devices $504_1$-$504_N$ in accordance with certain aspects disclosed herein. The host device 502 may be provided in an RFIC, modem, application processor or another type of device. The host device 502 may be adapted to exchange data with the one-wire subordinate devices $504_1$-$504_N$ over a single wire, referred to as the SDATA line 506 in the illustrated system 500. Data is encoded in a signal transmitted over the SDATA line 506, where the signal includes embedded clock information that can be used by the receiving device to decode data from the signal.

The host device 502 and the one-wire subordinate devices $504_1$-$504_N$ typically include respective protocol controllers 508, $510_1$-$510_N$. The protocol controllers 508, $510_1$-$510_N$ may include a processor, controller, state machine or other logic circuits configured to support one or more protocols. The protocol controller 508 in the host device 502 may be further configured to manage communication over the SDATA line 506. In some instances, the protocol controller 508 performs some of the functions of a host device. In some implementations, the protocol controller 508 in the host device 502 may be used to configure one or more of the one-wire subordinate devices $504_1$-$504_N$. The host device 502 may determine a configuration of a one-wire subordinate device $504_1$-$504_N$ that is a designated recipient of data to be transmitted over the SDATA line 506, and may cause the protocol controller 508 to encode data intended for the recipient one-wire subordinate device $504_1$-$504_N$ in a signal to be transmitted over the SDATA line 506 and addressed to the one-wire subordinate device $504_1$-$504_N$.

The host device 502 may include a transmit clock generator 512 that can be used to define timing for transmissions over the SDATA line 506. Each of the one-wire subordinate devices $504_1$-$504_N$ includes a local clock generation circuit $514_1$-$514_N$ that provides timing for the corresponding protocol controller $510_1$-$510_N$. The local clock generation circuits $514_1$-$514_N$ may be synchronized using synchronization pulses transmitted by the host device 502 after an SSC or transmitted by the host device 502 or by one of the one-wire subordinate devices $504_1$-$504_N$ after a line turnaround. In accordance with certain aspects of this disclosure, the local clock generation circuits $514_1$-$514_N$ may be synchronized using transitions in Manchester-encoded commands and data payloads transmitted over the SDATA line 506. The local clock generation circuits $514_1$-$514_N$ may include a ring oscillator or delay locked loop. In some implementations, the local clock generation circuits $514_1$-$514_N$ includes an injection-locked oscillator that responds to synchronizing pulses and/or the transitions in Manchester-encoded command and data payload transmissions.

A keeper circuit 516 may be coupled to the SDATA line 506 to facilitate line turnaround, in-band interrupt requests or arbitration procedures in accordance with certain aspects disclosed herein. In one example, the keeper circuit 516 may be configured as a positive feedback circuit that drives the SDATA line 506 through a high impedance output, and receives feedback from the SDATA line 506 through a low impedance input. The keeper circuit 516 may be configured to maintain the last asserted signaling state or voltage on the SDATA line 506. The keeper circuit 516 can be easily overcome by an active line driver in the host device 502 or in one of the one-wire subordinate devices $504_1$-$504_N$.

Figure 6:
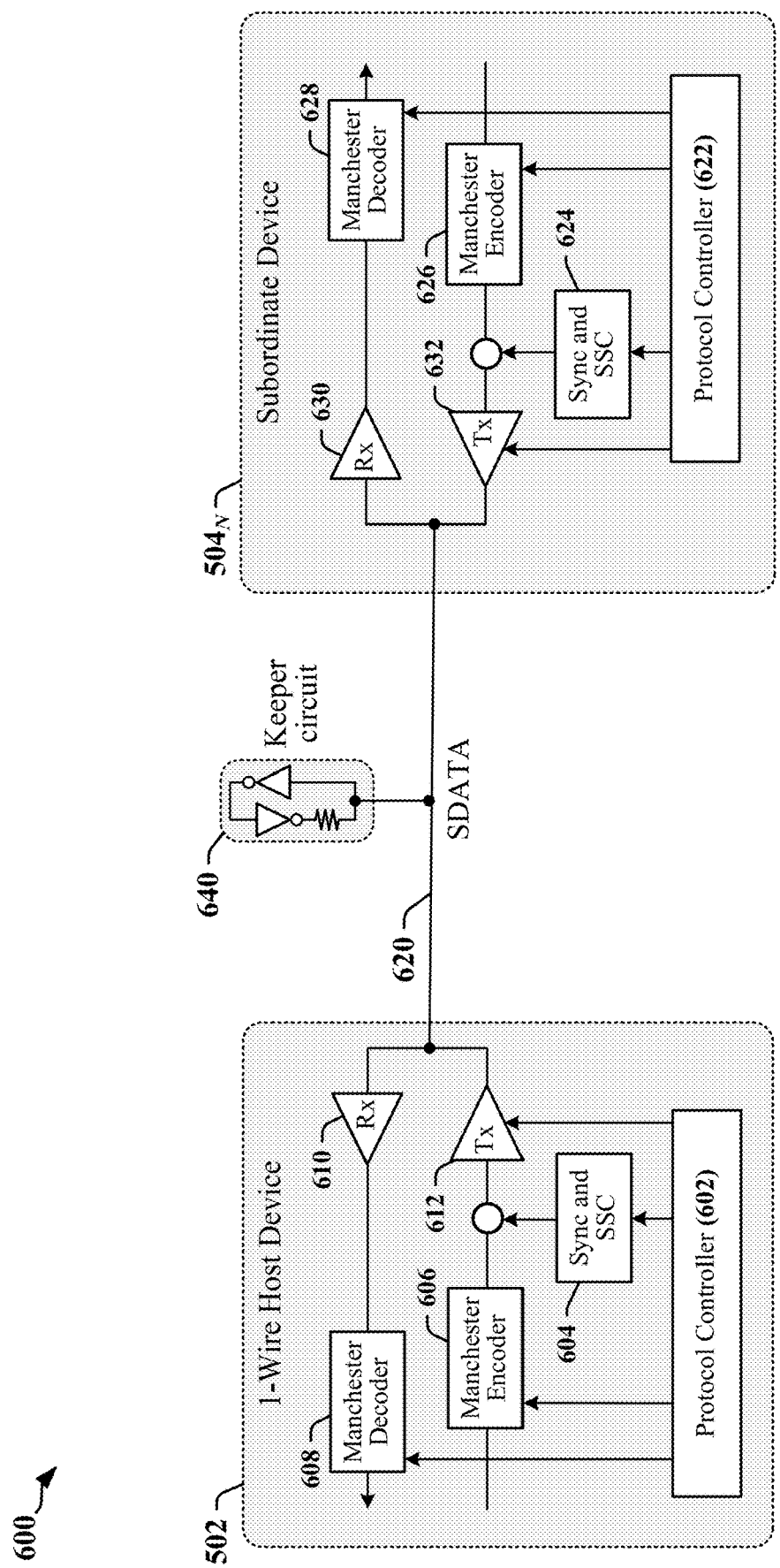
FIG. 6 illustrates an example of a 1-wire serial interface that may be configured in accordance with certain aspects of this disclosure.

FIG. 6 illustrates an example of a 1-wire serial interface 600 that may be configured in accordance with certain aspects of this disclosure. In the example, a host device 502 and one-wire subordinate device $504_N$ (see FIG. 5) are illustrated. The host device 502 includes a protocol controller 602. The protocol controller 602 may be implemented using a processor, microcontroller or finite state machine and may be used to control transmit and receive functions of the host device 502. The protocol controller 602 may include or be coupled to a signal generation circuit 604 that generates synchronization and SSC signals transmitted on the SDATA line 620 that couples the host device 502 to one or more subordinate devices $504_N$. The signal generation circuit 604 may be configured to generate different types of SSC to initiate arbitration, initiate data transfer or to abandon arbitration. The signal generation circuit 604 may be configured to generate synchronization pulses used to synchronize clock signals produced at the subordinate devices $504_N$ with a transmit clock signal generated in the host device 502.

The protocol controller 602 may be configured to selectively activate a Manchester encoder 606 and a Manchester decoder 608 based on mode of operation of the 1-wire serial interface 600. The Manchester decoder 608 may extract data and clock information from a signal received from the SDATA line 620. The protocol controller 602 may be further configured to format datagrams for transmission over the SDATA line 620. The protocol controller 602 may be further configured to generate commands to be transmitted over the SDATA line 620.

In the illustrated example, the one-wire subordinate device $504_N$ includes a protocol controller 622. The protocol controller 622 may be implemented using a processor, microcontroller or finite state machine and may be used to control transmit and receive functions of the one-wire subordinate device $504_N$. The protocol controller 622 may include or be coupled to a signal generation circuit 624 that generates synchronization pulses to be transmitted when the one-wire subordinate device 504 is transmitting over the SDATA line 620. The protocol controller 622 may be further configured to cause the signal generation circuit 624 to drive the SDATA line 620 to initiate an SSC in an in-band interrupt procedure and may be further configured to cause the signal generation circuit 624 to drive the SDATA line during an arbitration procedure. The synchronization pulses generated by the signal generation circuit 604 may be configured to synchronize clock signals produced at the host device 502 with a transmit clock signal generated in the subordinate device $504_N$.

The protocol controller 622 may be configured to selectively activate a Manchester encoder 626 and a Manchester decoder 628 based on mode of operation of the 1-wire serial interface 600. The Manchester decoder 628 may extract data and clock information from a signal received from the SDATA line 620. The protocol controller 622 may be further configured to format datagrams for transmission over the SDATA line 620. The protocol controller 622 may be further configured to disassemble datagrams and/or respond to commands received from the SDATA line 620.

The protocol controller 602 may be configured to manage and control the operation of a line driver 612 and a line receiver 610. The protocol controller 622 may be configured to manage and control the operation of a line driver 632 and a line receiver 630. The line drivers 612, 632 may present a high impedance to the SDATA line 620 when inactivated or disabled. For example, the output of the line driver 612 in the host device 502 may present a high impedance to the SDATA line 620 when the one-wire subordinate device $504_N$ is configured or expected to transmit data or control signals over the SDATA line 620. The output of the line driver 632 in the one-wire subordinate device $504_N$ is typically in the high impedance state when the host device 502 is driving the SDATA line 620.

A keeper circuit 640 coupled to the SDATA line 620 facilitates line turnaround, in-band interrupt requests and arbitration procedures in a bidirectional 1-wire serial bus. It is often desired to maintain the state of the SDATA line 620 when all devices are in high impedance mode, during line turnarounds or in arbitration procedures. Line turnaround occurs when the host device 502 transitions from transmitting to receiving or from receiving to transmitting. During arbitration procedures, the host device 502 may enter high impedance mode when the one-wire subordinate device $504_N$ has the option to transmit and the line driver in the host device 502 may present a high impedance to the SDATA line 620 to avoid contention. The state of the SDATA line 620 may be maintained using the keeper circuit 640. In one example, the keeper circuit 640 may be configured as a positive feedback circuit that drives the SDATA line 620 through a high impedance output, and receives feedback from the SDATA line 620 through a low impedance input. The keeper circuit 640 may be configured to maintain the last asserted voltage on the SDATA line 620. The keeper circuit 640 can be easily overcome by the line drivers 612, 632 in the host device 502 and the one-wire subordinate device $504_N$, respectively.

In accordance with certain aspects disclosed herein, the protocol used for controlling operation of a mixed mode serial bus that is coupled to concurrently active 2-wire subordinate devices and 1-wire subordinate devices. The protocols used to configure manage and control one-wire transmissions over the serial bus as disclosed herein may coexist with, be based on and/or be compatible with the protocols used to configure manage and control two-wire transmissions over the serial bus. Certain aspects of the disclosure relate to error detection at 1-wire subordinate devices that do not have access to the clock signal used by 2-wire subordinate devices.

Figure 7:
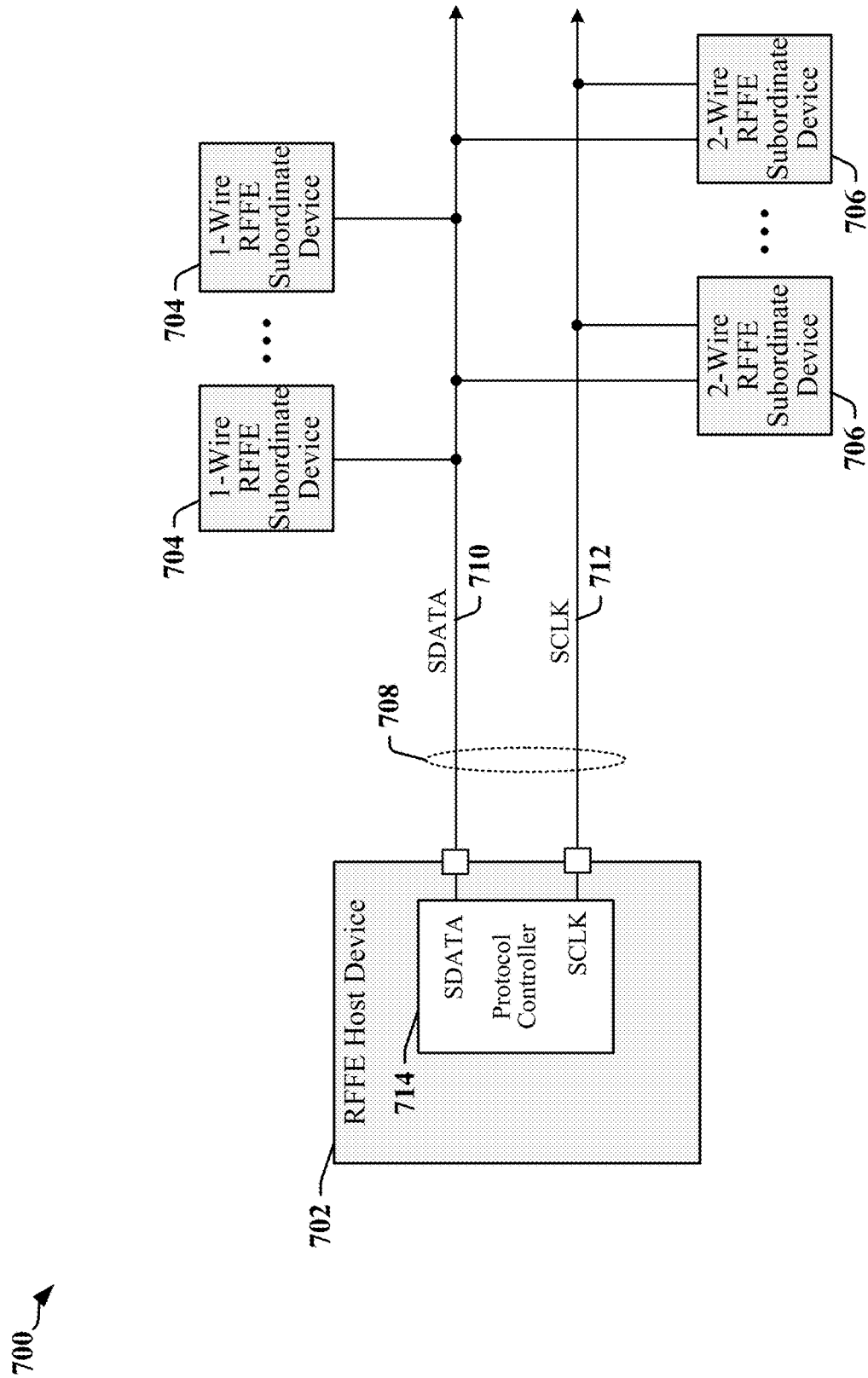
FIG. 7 illustrates a system in which one-wire subordinate devices and two-wire subordinate devices coexist in accordance with certain aspects disclosed herein.

FIG. 7 illustrates a system 700 in which one-wire subordinate devices 704 and two-wire subordinate devices 706 can coexist, and where a host device 702 can communicate with both the one-wire subordinate devices 704 and the two-wire subordinate devices 706 in accordance with certain aspects disclosed herein. The host device 702 may be provided in an RFIC, modem, application processor or another type of device. The host device 702 is coupled to one or more subordinate devices 704, 706 through at least the SDATA line 710 of a two-wire serial bus 708 that also has an SCLK line 712. Data can be encoded in a data signal transmitted over the SDATA line 710 and, in a two-wire mode of communication, a receiver can extract the data using a clock signal transmitted over the SCLK line 712. In the illustrated example, the serial bus 708 is operated in accordance with an RFFE protocol. In other examples, the serial bus 708 may be operated in accordance with another protocol, such as an I3C protocol, SPMI protocol or the like. In the illustrated example, each one-wire subordinate device 704 and each two-wire subordinate device 706 is coupled to the SDATA line 710. The one-wire subordinate devices 704 are adapted for a one-wire mode of communication, while the two-wire subordinate devices 706 are also coupled to the SCLK line 712 to receive the clock signal used in the two-wire mode of communication.

The host device 702 may include a protocol controller 714, which may be implemented using a processing circuit having a processor, controller, state machine or other logic. The protocol controller 714 may be configured to support one or more protocols that can be used to manage operation of the serial bus 708. In some implementations, the protocol controller 714 may be operable to configure one or more subordinate devices 704, 706. The protocol controller 714 may determine a configuration of a subordinate device 704, 706 that is a designated recipient of data to be transmitted over the serial bus 708, and may encode data in a signal to be transmitted over the SDATA line 710 accordingly. In some instances, a broadcast message directed to a combination of one-wire subordinate devices 704 and two-wire subordinate devices 706 may be sent twice, once in the one-wire mode of communication and once in the two-wire mode of communication. The protocol controller 714 may additionally determine whether and/or when a clock signal is to be transmitted over the SCLK line 712. In some implementations, the clock signal is suppressed when data is transmitted in the one-wire mode of communication to one or more one-wire subordinate devices 704.

According to certain aspects disclosed herein, the host device 702 may select between one-wire subordinate devices 704 and two-wire subordinate devices 706 when commencing a transaction. The host device 702 may use different sequence start conditions (SSCs) to precede one-wire and two-wire transactions. In some implementations, certain interface characteristics of the one-wire subordinate devices 704 and/or two-wire subordinate devices 706 may be configurable. For example, a one-wire subordinate device 704 and/or a two-wire subordinate device 706 coupled to the serial bus 708 may match a specified bus capacitance when driving the SDATA line 710 based on a configurable register setting that defines the capacitance specified for the SDATA line 710. In other instances, the specified bus capacitance can be hard-wired in the one-wire subordinate devices 704 and/or two-wire subordinate devices 706.

In certain implementations, a programmable sequence of synchronization pulses transmitted after the SSC or other start of frame signaling can be used at the receiver as edge sensitive phase synchronization triggers. In one example, the synchronization pulses are transmitted before transmission of data bits, including after line turnaround events when a receiving becomes a transmitting device. In other implementations, first-transmitted synchronization pulses can serve as start of frame signaling. In some implementations, each synchronization pulse is transmitted in a single clock cycle.

State transitions of the interface may be detected and used to disable or enable an oscillator in the receive clock generation circuit. For example, the oscillator may be enabled upon detection of the SSC or other start of frame signaling and may be disabled upon detection of a BPC or other end of frame signaling, thereby conserving energy by avoiding the need for an always-on, free-running oscillator. When the 1-wire serial bus is controlled by a protocol that is derived from RFFE protocols, an SSC indicates the start of frame.

Figure 8:
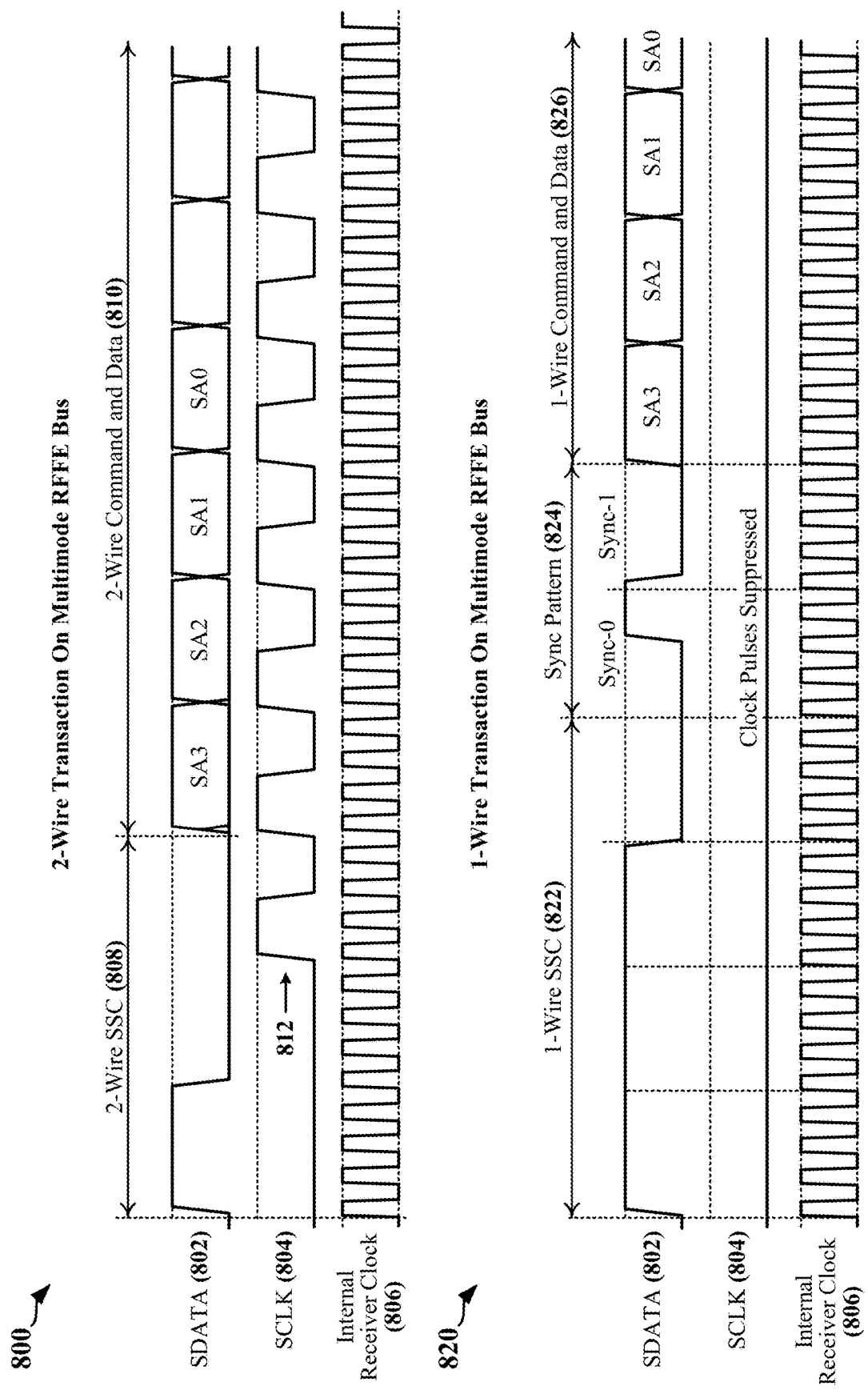
FIG. 8 illustrates the start of a 2-wire transaction and the start of a 1-wire transaction transmitted over a serial bus in accordance with certain aspects of this disclosure.

FIG. 8 illustrates the start of a 2-wire transaction 800 and the start of a 1-wire transaction 820 that may be transmitted over the serial bus 708 illustrated in FIG. 7 in accordance with certain aspects of this disclosure. The 2-wire transaction 800 and 1-wire transaction 820 may be formatted in accordance with RFFE protocols.

The 2-wire transaction 800 commences with an SSC 808 that has a duration consistent with RFFE protocols. The serial bus 708 is initially in an idle state, where both the SDATA line 802 and the SCLK line 804 are in a low signaling state. A host device 702 may initiate the 2-wire transaction 800 by transmitting a two-bit SSC 808. Bit-time, or the transmission time of each data bit, may be determined by the frequency of an internal clock signal used by the host device 702. The internal clock may be selected to control bitrate of the serial bus 708 during data transmission. The SSC 808 includes a pulse transmitted on the SDATA line 802 while the SCLK line 804 remains low. The pulse includes a one-bit high portion and is followed by a one-bit low portion. The SSC 808 may be followed by a subordinate address that may part of command and data information 810. In conventional RFFE operation, the command and data information 810, which includes a subordinate address [SA3:SA0]. Information may be captured from the SDATA line 802 based on timing of clock pulses in the transmit clock signal 812 that is provided on the SCLK line 804. No clock pulse is provided during transmission of the SSC 808, and a receiving device recognizes that the transitions in signaling state on the SDATA line 802 indicate control signaling when the SCLK line 804 remains low.

Various aspects of the SSC 808 are defined by RFFE protocols, including the durations of the high portion of the SSC 808 and the low portion of the SSC 808. The rise time ($T_R$) of the leading transition and the fall time ($T_F$) of the pulse-terminating transition are also defined by protocol. Limits on the frequency of the clock signal transmitted on the SCLK line 804 may be defined by design, application, and/or by RFFE specifications and protocols. A protocol controller 714 may be configured to transmit a modified SSC that indicates when a transaction is to be conducted with a one-wire subordinate device 704. In certain examples, the protocol controller 714 may transmit an extended-length SSC to target a one-wire subordinate device 704 for communication and/or to indicate that the transaction is to be conducted in a one-wire mode of communication. The extended-length SSC may have a duration that is greater than the duration of an SSC pulse defined by RFFE specifications for 2-wire operation. In some implementations, the protocol controller 714 may transmit a shortened SSC to target a one-wire subordinate device 704 for communication, where the shortened SSC includes a pulse with a duration that is less than the duration of an SSC pulse provided in accordance with RFFE specifications. In some instances, the protocol controller 714 may transmit an SSC with modified rise time and/or fall time to target a one-wire subordinate device 704 for communication.

The illustrated 1-wire transaction 820 provides one example of the use of an extended-duration SSC 822 that is configured to target one-wire subordinate devices 704. The serial bus 708 is initially in an idle state, where both the SDATA line 802 and the SCLK line 804 are in a low signaling state. The 1-wire nature of the transaction 820 is indicated by a pulse timing signature in the SSC 822. In the illustrated example, the pulse timing signature corresponds to a pulse duration of the SSC 822, which is three times greater than the pulse duration of the SSC 808 transmitted to initiate the 2-wire transaction 800. In other examples, the pulse duration of the SSC 822 may be some other multiple of the pulse duration of the SSC 808 that is transmitted to initiate the 2-wire transaction 800. The duration of the pulses in the SSC 808 and 828 can be measured or determined using an internal clock signal 806 provided in one-wire subordinate devices 704 and two-wire subordinate devices 706. The illustrated internal clock signal 806 is an oversampling signal, which has a frequency that is four times greater than the frequency of the transmit clock signal 812 transmitted on the SCLK line 804 during 2-wire transactions 800. In one example, the frequency of the transmit clock signal 812 is 52 MHz. The internal clock signal 806 is needed to measure the duration of the pulses in the SSC 808 and 828 because no clock pulses are provided on the SCLK line 804 during transmission of the SSC 808 or 828.

A host device 702 may initiate the 1-wire transaction 820 by transmitting the extended-duration SSC 822. The pulse in the extended-duration SSC 822 includes a three-bit high portion followed by a one-bit low portion. The extended-duration SSC 822 is followed by a synchronization pattern 824 comprising bits that can be used to synchronize the phase of the internal clock signal 806 with edges in the data signal transmitted over the SDATA line 802. Command and data information 826 is transmitted by the host device 702 in a Manchester-encoded data signal after the synchronization pattern 824 has been transmitted. Command and payload data in a 1-wire transaction 820 may be sampled or captured based on timing of the synchronized internal clock signal 806.

In accordance with certain aspects of this disclosure, clock phase and frequency synchronization at the receiver coupled to a one-wire serial bus is acquired and maintained through the use of Manchester encoding. Manchester encoding embeds clock information in every bit transmitted over the one-wire serial bus by mandating that each bit includes a transition at the middle of the bit transmission interval. According to one aspect of this disclosure, a receive clock signal can be resynchronized for every bit of the Manchester-encoded received in a data stream. Synchronization enforced at the rate of bit transmission can eliminate cumulative effects of phase and frequency variations, and can ensure error-free data recovery with unlimited data-frame length. In one aspect, higher power efficiencies can be achieved through the use of Manchester encoding.

Figure 9:
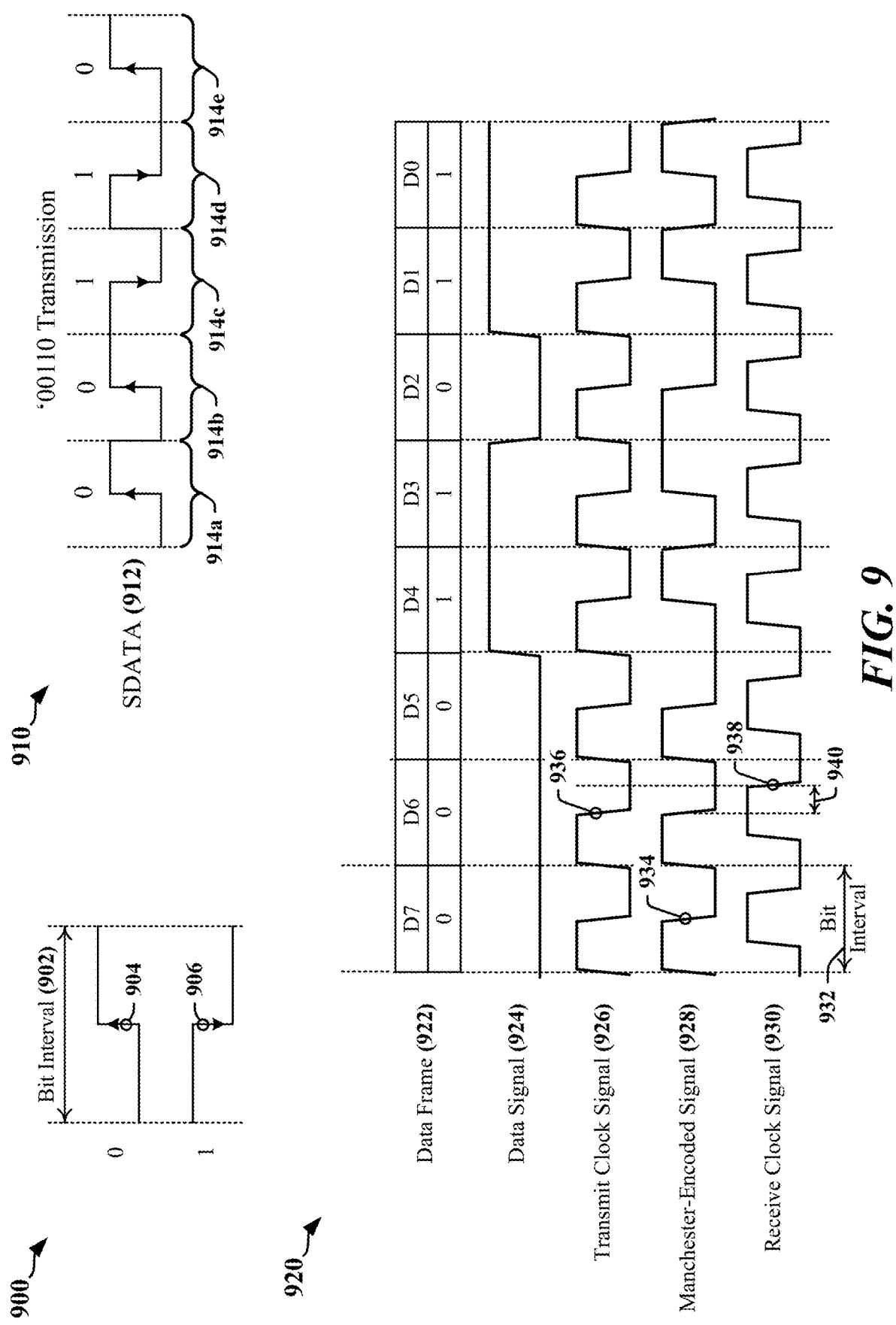
FIG. 9 illustrates certain aspects of Manchester encoding and control signaling that may be used to exchange data between a host device and one-wire subordinate devices in accordance with certain aspects of this disclosure.

FIG. 9 illustrates certain aspects of Manchester encoding and the control signaling that may be used to exchange data between the host device 502 and the one-wire subordinate devices 504$_1$-504$_N$ over the SDATA line 506 (see FIG. 5) in accordance with certain aspects of this disclosure. As shown in the first timing diagram 900, Manchester encoding encodes each bit of data in the direction of a transition occurring in the middle of a bit transmission interval 902. For example, a signal wire may be in a low state initially and a transition 904 to the high state indicates a '0' value bit. The signal wire may initially be in a high state and a transition 906 to the low state indicates a '1' value bit. Clock information is embedded in the data signal in the transitions that occur within every bit transmission interval 902.

The second timing diagram 910 illustrates five bit transmission intervals 914$a$-914$e$ in a signal carried on SDATA 912. A sequence of bits {0, 0, 1, 1, 0} that is transmitted in the five bit transmission intervals 914$a$-914$e$ illustrates the transitions within each of the five bit transmission intervals 914$a$-914$c$. It will be observed that transitions may occur at some boundaries between bit transmission intervals 914$a$-914$e$ and that no transitions occur at the other boundaries between bit transmission intervals 914$a$-914$e$.

The third timing diagram 920 illustrates certain aspects of timing related to the transmission of an 8-bit data frame 922 over the one-wire serial bus. The data frame 922 may be serialized and provided to a Manchester encoder in a data signal 924. In some implementations, the Manchester encoder receives parallel data for encoding, or accesses data frames stored in a transmit buffer. The Manchester encoder may encode the data in accordance with timing provided by a transmit clock signal 926. In one example, the frequency of the transmit clock signal 926 may be 52 MHZ. The Manchester encoder generates a Manchester-encoded signal 928 for transmission over the one-wire serial bus.

At the receiving device, the Manchester-encoded signal 928 is provided to a Manchester decoder. The Manchester decoder may include or be coupled to a clock generation circuit that is configured to generate a receive clock signal 930 to be used to decode data from the Manchester-encoded signal 928. The clock generation circuit may include one or more oscillators, one or more frequency dividers and a phase synchronization circuit. The phase synchronization circuit may be configured to synchronize the receive clock signal 930 based on timing information derived from the Manchester-encoded signal 928. The timing information includes transitions 934 Manchester-encoded signal 928 at the center of each bit transmission interval 932.

In the illustrated example, each falling edge 938 in the receive clock signal 930 is delayed with respect the corresponding falling edge 936 in the transmit clock signal 926. The delay 940 between the associated falling edges 936, 938 may be configured to provide sufficient setup and hold times for sampling circuits in the receiver device. The delay 940 between the associated falling edges 936, 938 may be configured to provide a tolerance for phase offsets between the transmit clock signal 926 and receive clock signal 930, including transitory phase offsets resulting from noise affecting the one-wire serial bus and phases caused by loss of synchronization or imperfect synchronization.

According to certain aspects of this disclosure, a one-wire serial bus may be configured, managed, controlled and/or monitored in accordance with a standards-defined or proprietary protocol. For the purposes of this description, the example of an RFFE protocol will be illustrated. However, the concepts are not limited to RFFE protocols and various aspects of this disclosure apply equally to I2C, I3C. SPI, SPMI and other standards-defined or proprietary protocols. For example, other protocols employ or can be adapted to use similar arbitration schemes, start of frame (SoF) and end of frame (EoF) signaling, command structure and datagram or data frame configurations. In some instances, a protocol defined for use with a two-wire serial bus may be adapted to implement features such as line-turnaround that are used to control the one-wire serial bus.

Figure 10:
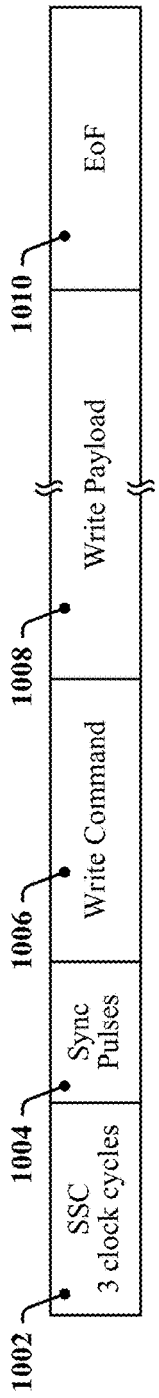
FIG. 10 illustrates write and read transactions executed on a 1-wire serial bus that may be adapted in accordance with certain aspects disclosed herein.
Figure 10:
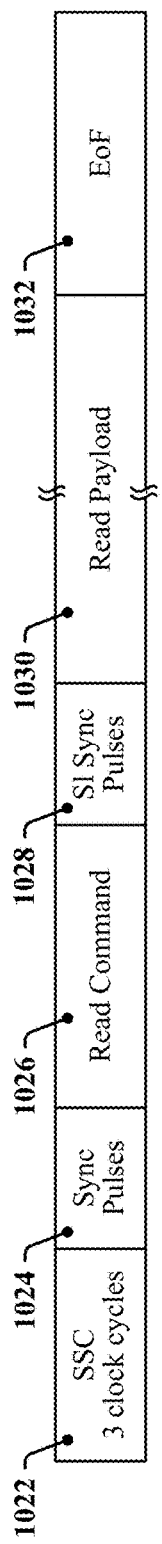

FIG. 10 illustrates a write transaction 1000 executed on a 1-wire serial bus configured in accordance with certain aspects disclosed herein. The write transaction 1000 may commence with the transmission of an SSC 1002. In the illustrated example, the SSC 1002 has a duration of three transmit clock cycles. In some implementations, an arbitration may optionally follow the SSC 1002. The write transaction 1000 continues with transmission of synchronization pulses 1004 that can be used by the receiving device to synchronize its local clock generation circuit. A write command 1006 is transmitted. The write command 1006 may have a structure and content compatible or compliant with one or more commands defined by RFFE protocols. The write command 1006 may be encoded using Manchester encoding. The host device then transmits a payload 1008 that is directed to a device identified in the write command 1006. The payload 1008 may be encoded using Manchester encoding. The write transaction 1000 is terminated by an EoF 1010. In some instances, the EoF 1010 may be indicated by SDATA being idle for a number of cycles. In one example, the EoF 1010 is indicated when SDATA is idle for 7 cycles of the transmit clock.

A read transaction 1020 executed on a 1-wire serial bus and configured in accordance with certain aspects disclosed herein may commence with the transmission of an SSC 1022. In the illustrated example, the SSC 1022 has a duration of three transmit clock cycles. The read transaction 1020 continues with transmission of synchronization pulses 1024 that can be used by the receiving device to synchronize its local clock generation circuit. A read command 1026 is transmitted. The read command 1026 may have a structure and content compatible or compliant with one or more commands defined by RFFE protocols. The read command 1026 may be encoded using Manchester encoding.

The host device provides a turnaround period during which the host device causes its line driver to enter a high impedance state and the subordinate device addressed by the read command 1026 activates its line driver. The subordinate device transmits synchronization pulses 1028 that can be used by the host device to synchronize its receive clock generation circuit. In one example, the subordinate device uses two cycles of its transmit clock signal to transmit the synchronization pulses 1028. The subordinate device then transmits a payload 1030. The payload 1030 may be encoded using Manchester encoding. The read transaction 1020 is terminated by an EoF 1032. In some instances, the EoF 1032 may be indicated by SDATA being idle for a number of cycles. In one example, the EoF 1032 is indicated when SDATA is idle for 7 cycles of the transmit clock.

Figure 11:
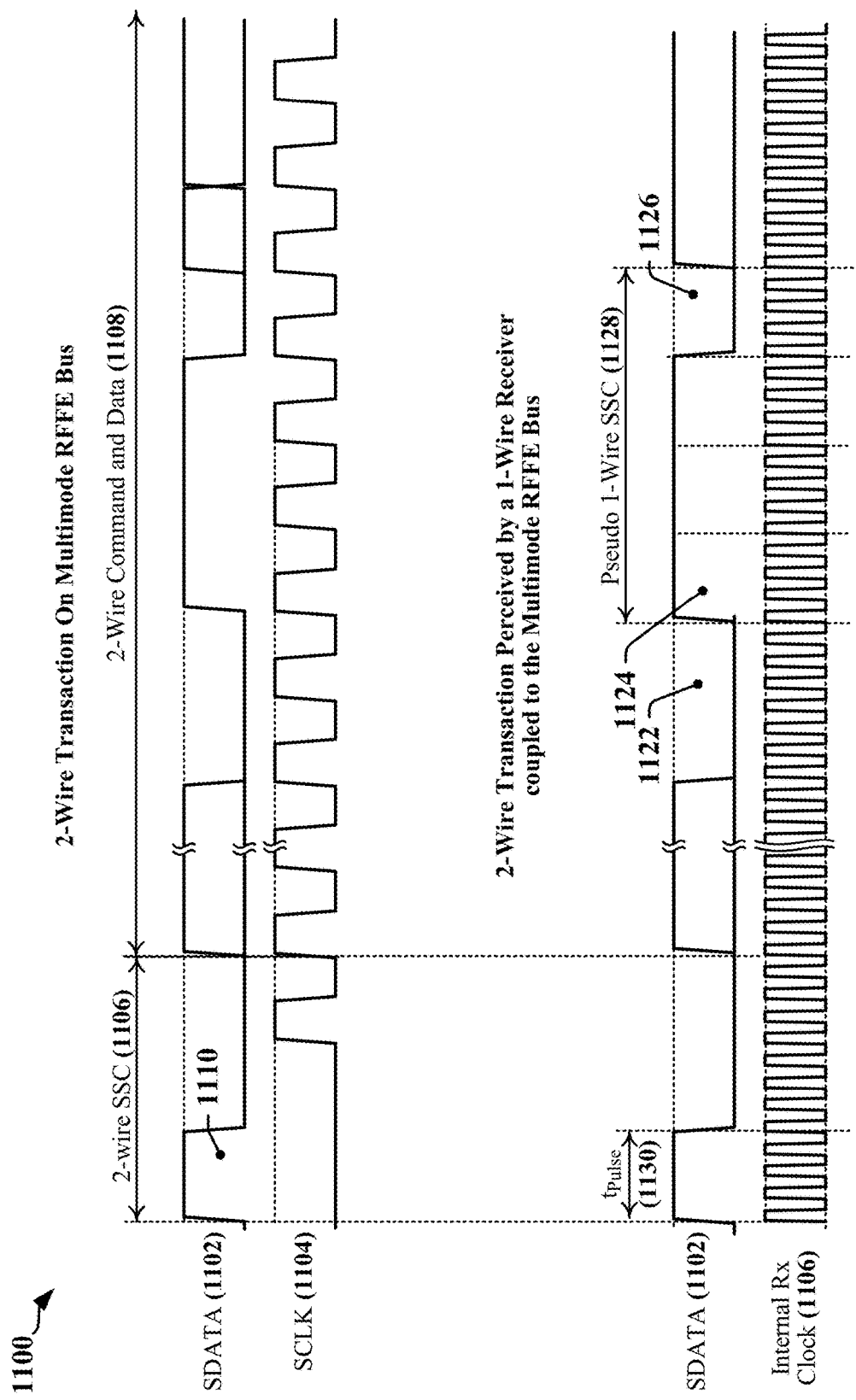
FIG. 11 illustrates an example of a bus state error that can affect a mixed-mode serial bus.

Certain bus state errors can occur when a serial bus supports different mutually exclusive modes of communication. For example, a mixed-mode serial bus that supports both one-wire and two-wire RFFE transactions can be susceptible to certain errors that can cause subordinate devices and host devices to deadlock, including when a subordinate device does not respond to a command and/or when the subordinate device detects an error when decoding data. In some instances, a host device or a subordinate device unilaterally or improperly enters an a state in which it is awaiting signaling that will not be transmitted. FIG. 11 illustrates one example of a bus state error that can occur while a 2-wire RFFE transaction 1100 is being conducted over a mixed-mode serial bus. In the illustrated example, SDATA 1102 and SCLK 1104 are in the nominal idle signaling state for some period of time before a host device transmits a 2-wire SSC 1106 over SDATA 1102 in order to start the 2-wire RFFE transaction 1100. The 2-wire SSC 1106 includes a pulse 1110 that has a duration ($t_{Pulse}$ 1130) corresponding to one clock period of the transmit clock transmitted over SCLK 1104. A 1-wire receiver coupled to SDATA 1102 measures the duration of the pulse and recognizes that a 2-wire transaction is commencing. The 1-wire receiver may enter an idle mode and await a next bus idle period, potentially followed by 1-wire SSC.

The 1-wire receiver is not coupled to SCLK 1104 and determines that the serial bus is idle solely from wire state of SDATA 1102. In the illustrated example, the 2-wire command and data 1108 transmitted over the serial bus produces a sequence of wire states 1122, 1124, 1126 that may be perceived by the 1-wire receiver as a 1-wire SSC 1128. During transmission of the 2-wire command and data 1108, a sequence of all-zero bits cause SDATA 1102 to appear to be in an idle state 1122. The minimum idle period before transmission of an SSC may be defined by protocol to be less than the duration of 8 periods of the transmit clock transmitted over SCLK 1104, and a sequence of '0' consecutive bits may appear to be a valid idle period to the 1-wire receiver. The all zero-bit transmission may be followed by a sequence of three '1' bits and at least one '0' bit. The occurrence of the apparent idle state 1122 followed by the 3-bit high state may be perceived by the 1-wire receiver as a valid 1-wire SSC 1128. The 1-wire receiver may exit idle mode and enter an erroneous state in which it waits for a synchronization pattern.

Another example of a bus state error can occur while a 2-wire RFFE transaction 1100 is being conducted over a mixed-mode serial bus. The bus state error may be caused by a command discard by the 1-wire receiver or as a result of error detection in the 1-wire receiver. In some instances, a 1-wire receiver does not return data as expected. The 1-wire receiver may fail to respond with an acknowledgement to a write command or may fail to transmit data in response to a read command. A parity error detected in the received 1-wire payload may cause the 1-wire receiver to fail to acknowledge a receipt of a command or data. In some instances, a parity error can be caused by a bit error, and in other instances, the parity error may be caused by a clock synchronization error that causes the 1-wire receiver to fail to capture one or more bits. In the latter instances, the 1-wire receiver may refrain from sending a negative acknowledgement since the 1-wire receiver cannot reliably know when the acknowledgement is expected by the host device.

Certain aspects of this disclosure relate to circuits and methods by which devices coupled to a mixed-mode serial bus can properly and reliably handle error conditions that occur while one-wire or two-wire transactions are conducted over the serial bus. Certain error handling techniques are disclosed that can enable devices coupled to the mixed-mode serial bus to recover from error conditions that can occur during 1-wire and/or 2-wire transactions on the bus, and state errors that can otherwise block further bus operations.

In certain aspects, timing circuits may be configured to force termination of read or write operations when an expected response is delayed. In one example, one or more of the timing circuits may be configured to reset a receiver or transmitter state machine after data reception is delayed by a programmable number of clock cycles. In another example, one or more of the timing circuits may be configured to enforce a minimum period of time before a local clock oscillator is disabled or idled on 1-wire peripheral devices. The enforced timeout period may be configured with a duration that causes the local clock oscillator to continue active operation until packets received with errors have been completed and fully rejected and to ensure that a 1-wire peripheral device can reliably detect the next SSC and can be properly synchronized when the next SSC is a 1-wire SSC.

In certain aspects, timing circuits may be configured with a programmable duration that supports bus snooping by a 1-wire peripheral device before the 1-wire peripheral device enters an idle or low power mode of operation. Bus snooping and associated logic circuits in 1-wire peripheral devices may be configured to reject activity related to valid 2-Wire communication on the bus data line (SDATA).

In certain aspects, timing circuits in a 2-wire peripheral device may be configured to reject 1-wire communication activity on the bus data line (SDATA) for a programmable length of time based on clock signal (SCLK) inactivity detection.

The timing circuits may include timers or counters that are clocked by an internal transmit or receive clock signal or by a programmable clock frequency that can be configured to provide a real time clock reference.

Figure 12:
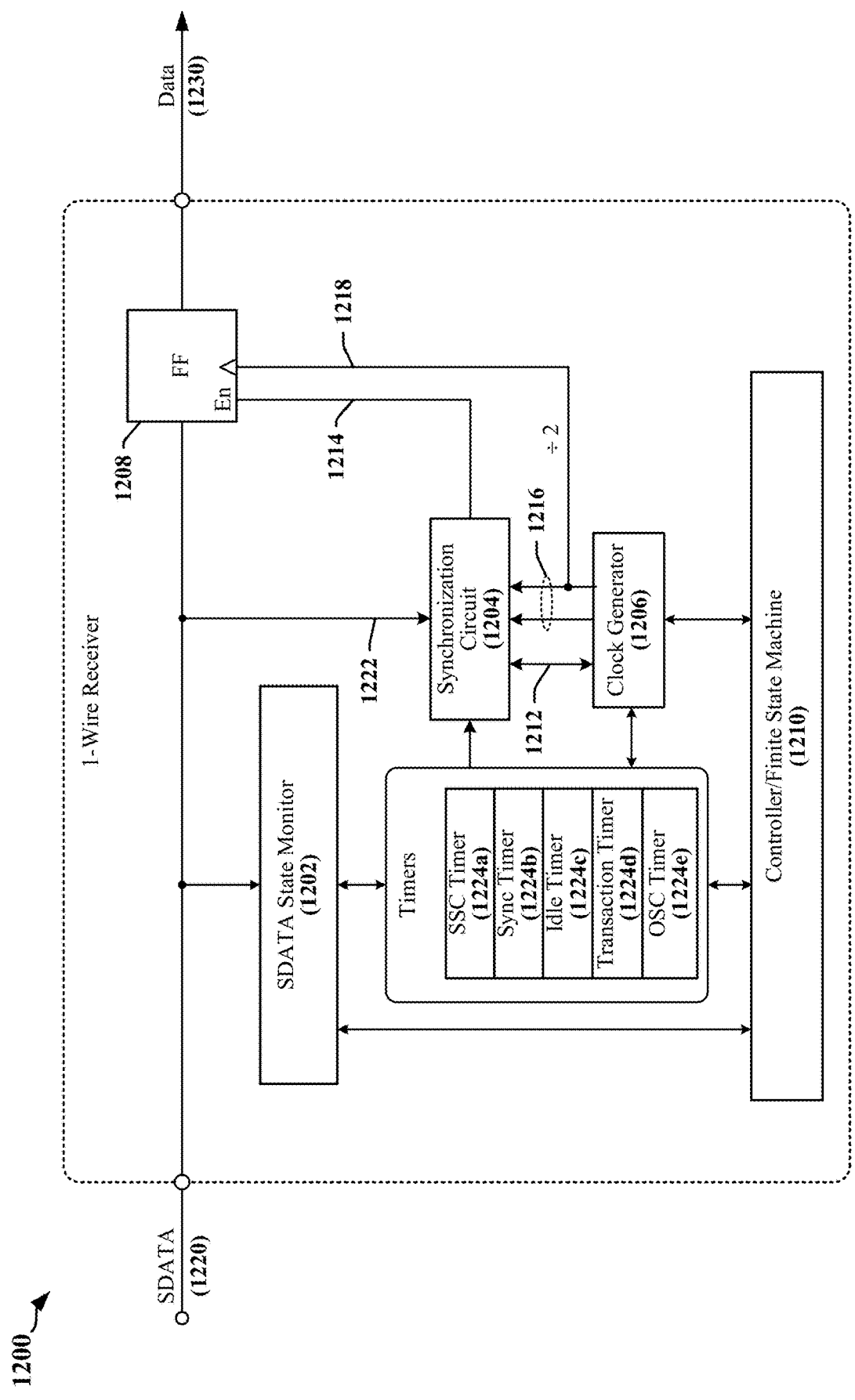
FIG. 12 illustrates a one-wire receiving circuit configured in accordance with certain aspects disclosed herein.

FIG. 12 illustrates a receiver circuit 1200 that can be configured for 1-wire operation in accordance with certain aspects disclosed herein. The receiver circuit 1200 is configured or adapted to be coupled to a data line (SDATA 1220) of a mixed-mode serial bus. In the illustrated example, the receiver circuit 1200 is provided in a 1-wire subordinate device and is configured to operate as a Manchester decoder that produces an output 1230 representative of data encoded in a signal transmitted over SDATA 1220.

The receiver circuit 1200 includes a clock generator 1206 that may be configured to provide multiple clock signals 1216. The clock generator 1206 may include or be coupled to a programmable oscillator. The programmable oscillator may be configured to produce a base clock signal at a frequency that is a multiple of the frequency of the clock signal used by a transmitter to encode data for transmission over SDATA 1220. In one example, the programmable oscillator can be configured to produce a base clock signal that has a frequency four times (4×) higher than the frequency of the clock signal used by a transmitter to encode data for transmission over SDATA 1220. In some implementations, the programmable oscillator may be implemented using a programmable ring oscillator circuit. The clock generator 1206 may include frequency dividers, delay circuits, phase shifters, inverters and other circuits that can modify frequency or phase of a clock signal. In the illustrated example, the clock generator 1206 outputs a sampling signal 1218 that is half the frequency of the base clock signal and double the frequency of the clock signal used by the transmitter during encoding. The sampling signal 1218 clocks a flipflop 1208 coupled to SDATA 1220, such that the flipflop 1208 can capture data from SDATA 1220 when enabled.

The frequency and phase of the clock signals 1216 may be controlled using a synchronization circuit 1204. The synchronization circuit 1204 may be configured to align edges in the clock signals 1216 with transitions in a data signal transmitted over SDATA 1220. The synchronization circuit 1204 may configure a control signal 1214 to enable and disable the flipflop 1208 based on current state of the receiver circuit 1200. The synchronization circuit 1204 may be configured to enable and disable the oscillator in the clock generator 1206 based on current state of SDATA 1220. In one example, a state monitoring circuit 1202 determines when an SSC has been received, when SDATA 1220 is active and carrying a data signal, and when an end of transmission has been detected. In some implementations, the synchronization circuit 1204 uses control and status signals 1212 to manage operation of the clock generator 1206. For example, the synchronization circuit 1204 may be configured to enable the oscillator responsive to a control signal 1222 received from the state monitoring circuit 1202 indicating detection of the SSC, cause the clock signals 1216 to be frequency and phase aligned during transmission of synchronization pulses and continuously adjust frequency and phase synchronize the clock signals 1216 using edges detected in a data signal received from SDATA 1220 during active transmission.

The illustrated receiver circuit 1200 includes multiple timers 1224a-1224e. One or more of the timers 1224a-1224e may be used by the state monitoring circuit 1202 to determine when an SSC has been detected, and whether the SSC is a 1-wire SSC or a 2-wire SSC. One or more of the timers 1224a-1224c may be monitored by a controller that is configured to manage the operational state of the receiver circuit 1200. In the illustrated example, the controller circuit includes a finite state machine 1210. The finite state machine 1210 may be configured to handle error conditions that occur while one-wire or two-wire transactions are conducted over the mixed-mode serial bus.

Figure 13:
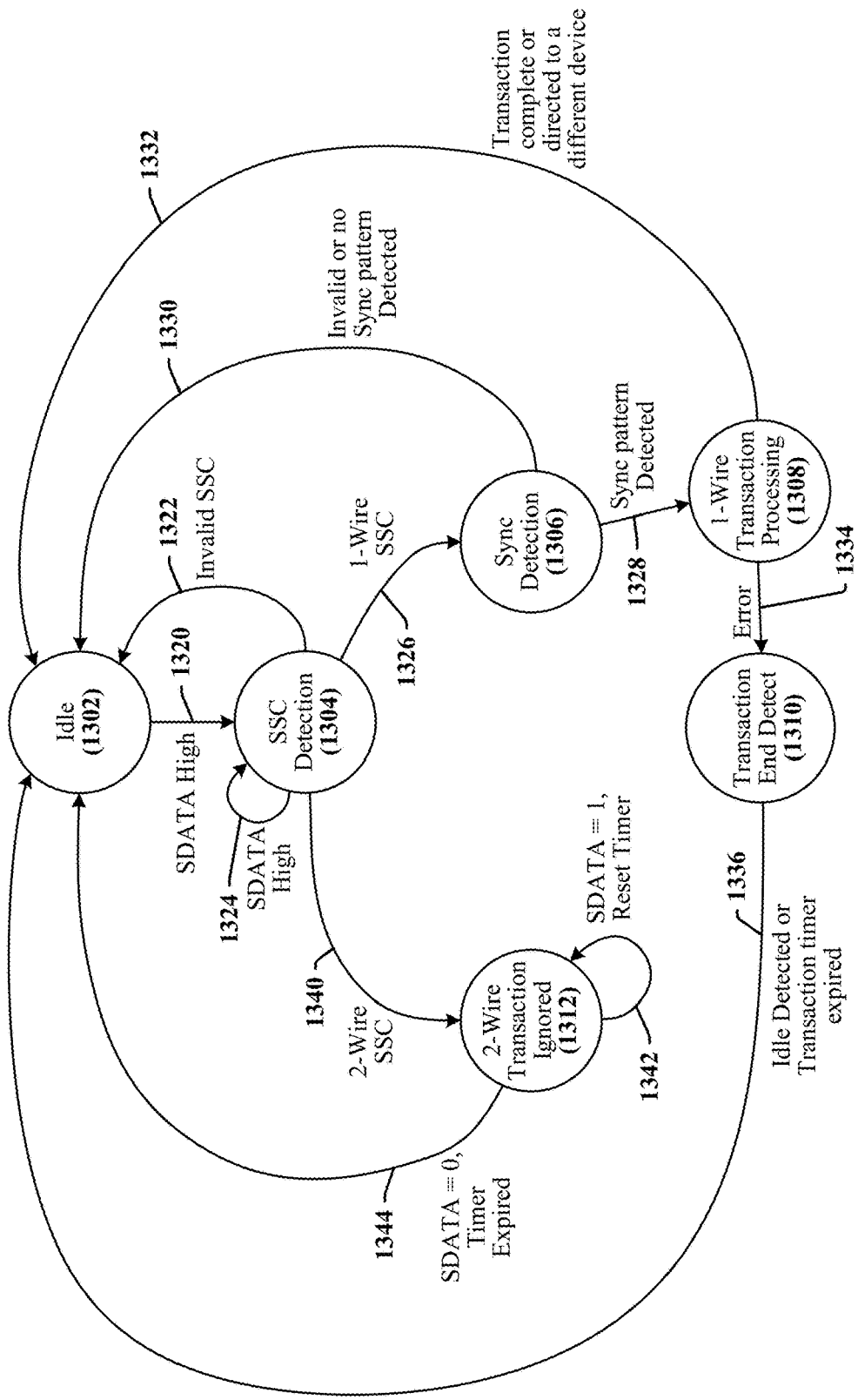
FIG. 13 is a state diagram illustrating the operation of the one-wire receiving circuit of FIG. 12 according to certain aspects disclosed herein.

FIG. 13 includes an example of a state diagram 1300 that illustrates certain operations and functions that can be performed by the receiver circuit 1200 of FIG. 12 when the receiver circuit 1200 is coupled to a data line (SDATA 1220) of a mixed-mode serial bus. The receiver circuit 1200 may be in an idle state 1302 when not actively involved in a transaction or when no activity is detected on SDATA 1220. In some implementations, the finite state machine 1210 may cause an oscillator circuit in the clock generator 1206 to be disabled or idled in order to conserve power.

The receiver circuit 1200 transitions to an SSC detection state 1304 when the finite state machine 1210 determines that SDATA 1220 has transitioned to an active or high logic state 1320. In the SSC detection state 1304, the finite state machine 1210 may activate the oscillator circuit in the clock generator 1206 and other circuits that have been powered down or inactivated in the idle state 1302. The finite state machine 1210 may determine that SDATA 1220 has transitioned to a high logic state based on signaling received from the state monitoring circuit 1202. The receiver circuit 1200 remains in the SSC detection state 1304 while SDATA 1220 remains in the high logic state 1324. The finite state machine 1210 may initialize and monitor the SSC timer 1224a to determine the next state for the receiver circuit 1200. In one example, the SSC timer 1224a is halted when SDATA 1220 transitions to an inactive, low logic state at the termination of a pulse on SDATA 1220. The time value maintained by the SSC timer 1224a indicates the duration of the pulse. The finite state machine 1210 may determine whether the duration of the pulse corresponds to a valid SSC. In some implementations, the finite state machine 1210 may be configured to recognize a standards defined 2-wire SSC and one or more 1-wire SSCs. For example, a 2-wire SSC may have duration corresponding to the period of the transmitter clock signal transmitted on SCLK (i.e., one clock cycle), while a 1-wire SSC may have a duration corresponding to the duration of three clock cycles of the transmitter clock signal. In some instances, other types of 1-wire SSC are defined with durations that are some other multiples of the period of the transmitter clock signal.

When the finite state machine 1210 determines that the pulse detected on SDATA 1220 has a duration that corresponds to an invalid SSC 1322, the pulse may be ignored and the finite state machine 1210 may cause the receiver circuit 1200 to return to the idle state 1302. When the finite state machine 1210 determines that the pulse detected on SDATA 1220 has a duration that corresponds to a valid 2-wire SSC 1340, the finite state machine 1210 may the cause receiver circuit 1200 to transition to a 2-wire transaction monitoring state 1312 in which the 2-wire transaction is ignored. In some implementations, the finite state machine 1210 may initialize the idle timer 1224*c* when the receiving circuit enters the 2-wire transaction monitoring state 1312. In some examples, the idle timer 1224*c* is reset when SDATA 1220 transitions to the high logic state 1342 and is configured to expire when SDATA 1220 remains in the low logic state for a programmable number of clock pulses of the sampling signal 1218. In other examples, the idle timer 1224*c* is configured to expire after a duration of time calculated to ensure that the 2-wire transaction has fully commenced before the idle timer 1224*c* expires. The finite state machine 1210 may cause the receiver circuit 1200 to return to the idle state 1302 when the idle timer 1224*c* expires 1344.

When the finite state machine 1210 determines that the pulse detected on SDATA 1220 while the receiver circuit is in the SSC detection state 1304 has a duration that corresponds to a valid 1-wire SSC 1326, the finite state machine 1210 may the cause receiver circuit 1200 to transition to a sync detection state 1306. The finite state machine 1210 may initialize the Sync timer 1224*b* when the receiving circuit enters the sync detection state 1306. The Sync timer 1224*b* may be configured to expire after a period of time in which a synchronization pattern is expected to be received over SDATA 1220. The period of time may be programmed or configured based on transmitter clock rate and/or to accommodate expected latencies or transmitter startup delays. The finite state machine 1210 may cause the receiver circuit 1200 to return to the idle state 1302 if the Sync timer 1224*b* expires or an invalid synchronization pattern 1330 is detected. The finite state machine 1210 may cause the receiver circuit 1200 to transition to a 1-wire transaction processing state 1308 when a valid synchronization pattern 1328 is detected before the Sync timer 1224*b* expires. The receiving circuit 1200 may be configured to receive and decode Manchester-encode commands and data in the 1-wire transaction processing state 1308. The finite state machine 1210 may cause the receiver circuit 1200 to return to the idle state 1302 after detecting that the 1-wire transaction is directed to a different device or after the 1-wire transaction is successfully completed 1332.

The finite state machine 1210 may determine that an error 1334 occurred while processing a 1-wire transaction in the 1-wire transaction processing state 1308 and may cause the receiving circuit to abandon the 1-wire transaction and enter a transaction termination detection state 1310. The finite state machine 1210 may initialize the Transaction timer 1224*d* when the receiving circuit enters the transaction termination detection state 1310. The Transaction timer 1224*d* may be configured to expire after a duration of time calculated to have sufficient length to ensure that the 1-wire transaction has been completed. In some implementations, the Transaction timer 1224*d* may be configured to expire after SDATA 1220 has been idle for a period of time defined by protocol or application. The Transaction timer 1224*d* may be configured to enable the receiving circuit to drop data packets when a parity or cyclic redundancy check (CRC) error is detected and to remain ready for an SSC transmitted immediately after the dropped data packet. The finite state machine 1210 may cause the receiver circuit 1200 to return to the idle state 1302 after the Transaction timer 1224*d* has expired 1336.

In accordance with certain aspects of this disclosure, the finite state machine 1210 may initialize the oscillator timer 1224*e* when the receiving circuit enters the idle state 1302. One or more circuits in the receiving circuit 1200, including an oscillator circuit and associated circuits in the clock generator 1206 may be disabled or idled after the oscillator timer 1224*e* expires. The oscillator timer 1224*e* may be configured to expire after a duration calculated to obtain an optimal tradeoff between power consumption and responsiveness of the clock generator 1206. In some implementations, the clock generator 1206 requires some period of time to achieve frequency and/or phase lock. An idled clock generator 1206 may be activated upon detecting the leading edge of a possible SSC. In one example, the oscillator timer 1224*e* enables the clock generator 1206 to remain active when a first transaction is followed immediately by a second transaction. In the latter example, the oscillator timer 1224*e* may be programmed to expire after the minimum or expected SDATA idle period between an end of transaction and a next SSC.

A host device configured in accordance with certain aspects of this disclosure may be configured with one or more timers that enable the host device to avoid bus lockout when a 1-wire receiving device detects an error in transmission. For example, the receiving circuit 1200 may exit the 1-wire transaction processing state 1308 after detecting a parity or CRC error in data or commands transmitted by the host device. The host device may initiate a response timer after completing transmission of data or command bits in order to minimize or limit waiting time for an acknowledgement from the receiving circuit 1200 or data transmitted by the receiving circuit 1200 in response to a read command. For instance, the receiving circuit 1200 may detect an error in a read command transmitted by the host device and may abandon the transaction without responding to the read command. The host device is typically not aware that the receiving circuit 1200 has disengaged from the transaction and may be configured to wait for a response until the response timer has expired.

Figure 14:
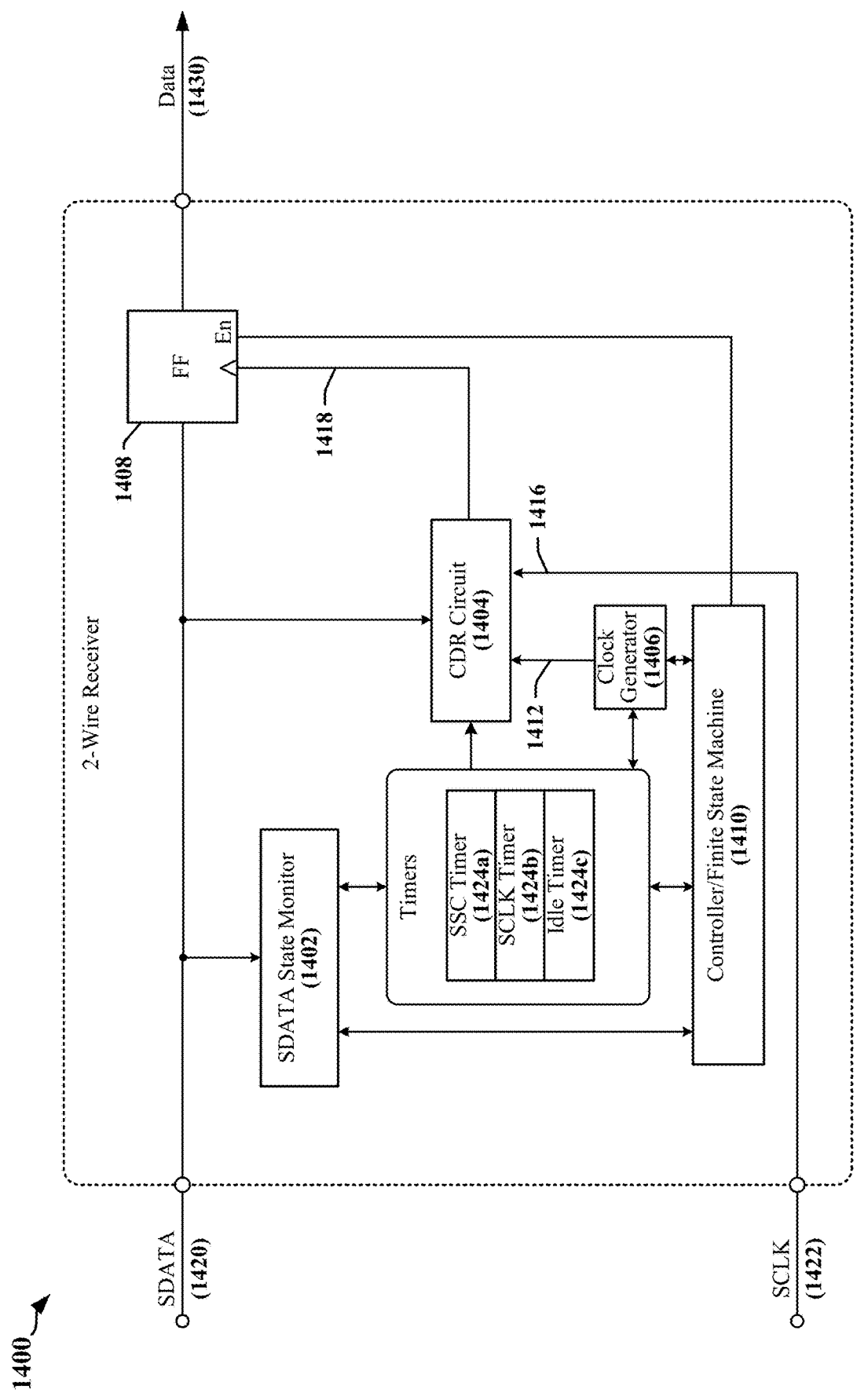
FIG. 14 illustrates a two-wire receiving circuit configured in accordance with certain aspects disclosed herein.

FIG. 14 illustrates a receiver circuit 1400 that can be configured for 2-wire operation in accordance with certain aspects disclosed herein. The receiver circuit 1400 is configured to be coupled to a data line (SDATA 1420) and clock line (SCLK 1422) of a mixed-mode serial bus. In the illustrated example, the receiver circuit 1400 is provided in a 2-wire subordinate device and is configured to provide an output 1430 representative of data encoded in a signal transmitted over SDATA 1420 using a sampling clock signal 1418 derived from a bus clock signal 1416 received over SCLK 1422.

In the illustrated example, the sampling clock signal 1418 may be generated using a clock and data recovery circuit (the CDR circuit 1404). The CDR circuit 1404 may include or be coupled to a clock generator 1406 that provides an internal clock signal 1412. In some implementations, the internal clock signal 1412 has a frequency that is a multiple of the frequency of the bus clock signal 1416 received over SCLK 1422. In one example, the internal clock signal 1412 has a frequency four times (4x) higher than the frequency of the bus clock signal 1416. In some implementations, the CDR circuit 1404 may be implemented using a programmable ring oscillator circuit and the CDR circuit 1404 may be configured to phase align the sampling clock signal 1418 with the bus clock signal 1416. The CDR circuit 1404 may include frequency dividers, delay circuits, phase shifters, inverters and other circuits that can modify frequency or phase of a clock signal. In the illustrated example, the CDR circuit 1404 outputs a sampling signal 1418 that is half the frequency of the base clock signal and double the frequency of the bus clock signal 1416. The sampling signal 1418 clocks a flipflop 1408 coupled to SDATA 1420, such that the flipflop 1408 can capture data from SDATA 1420 when enabled. The flipflop 1408 may be enabled by a finite state machine 1410 that is configured to manage state of the receiver circuit 1400 and/or to handle error conditions that occur while one-wire or two-wire transactions are conducted over the mixed-mode serial bus.

In accordance with certain aspects of this disclosure the receiver circuit 1400 may include a state monitoring circuit 1402 that is configured to determine when an SSC has been received, when SDATA 1420 is active and carrying a data signal, and when an end of transmission has been detected. The illustrated receiver circuit 1400 includes multiple timers 1424*a*-1224*c*. One or more of the timers 1424*a*-1224*c* may be used by the finite state machine 1410 to determine whether a detected SSC is a 1-wire SSC or a 2-wire SSC and/or to manage the operation of the receiver circuit 1400. The detection of the type of the SSC may enable the receiver circuit 1400 to enter an idle state early and thereby conserve power. Additionally, one or more of the timers 1424*a*-1424*c* may be used to manage operational state of the receiver circuit 1400 before a bus clock signal 1416 is available. The timers 1424*a*-1424*c* may be clocked by a real-time clock signal provided by the clock generator 1406 or by the internal clock signal 1412, a frequency-divided version of the internal clock signal 1412, or another clock signal that is generated by the clock generator 1406 and has a frequency that is a multiple of or greater than the frequency of the internal clock signal 1412.

Figure 15:
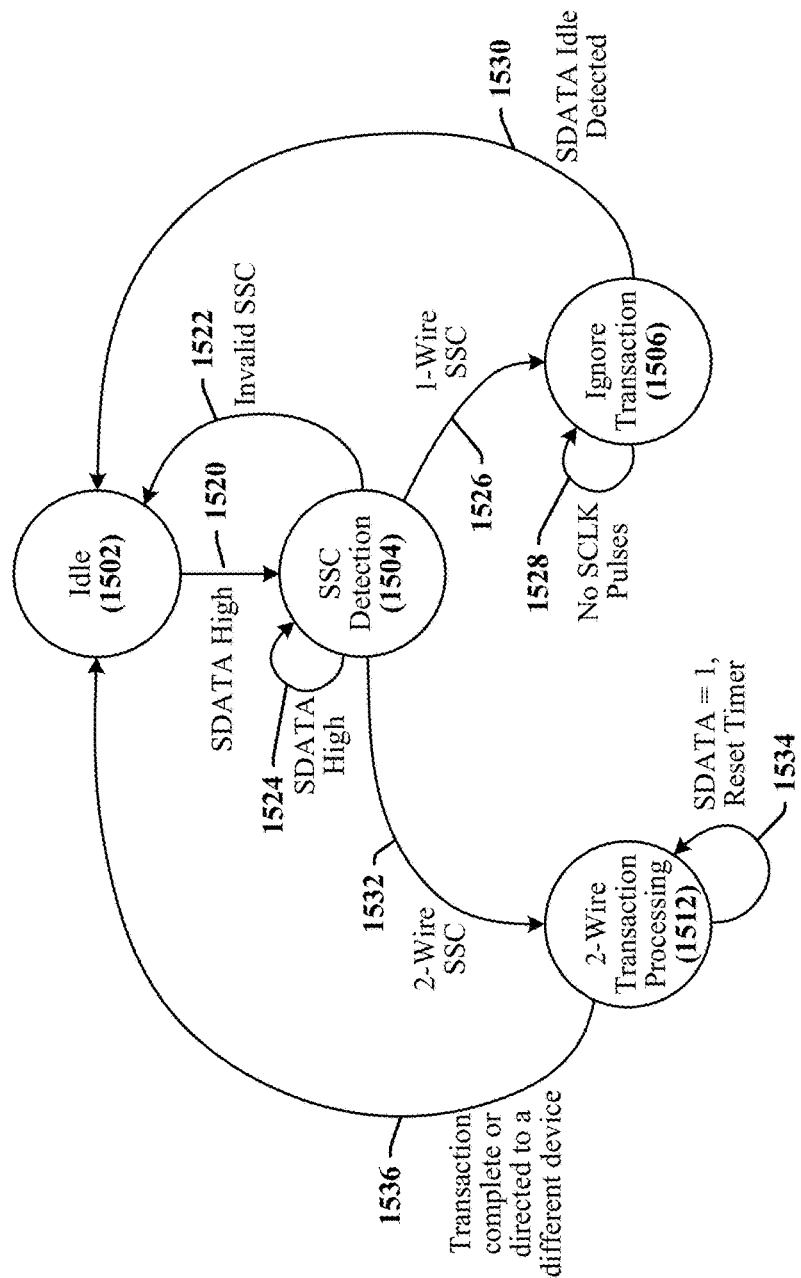
FIG. 15 is a state diagram illustrating the operation of the two-wire receiving circuit of FIG. 14 according to certain aspects disclosed herein.

FIG. 15 includes an example of a state diagram 1500 that illustrates certain operations and functions performed by the receiver circuit 1400 of FIG. 14 when the receiver circuit 1400 is coupled to SDATA 1420 and SCLK 1422 of a mixed-mode serial bus. The receiver circuit 1400 may be in an idle state 1502 when not actively involved in a transaction or when no activity is detected on SDATA 1420. In some implementations, the finite state machine 1410 may cause an oscillator circuit in the clock generator 1406 to be disabled or idled in order to conserve power when the receiver circuit 1400 enters the idle state 1502.

The receiver circuit 1400 transitions to an SSC detection state 1504 when the finite state machine 1410 determines that SDATA 1420 has transitioned to an active, high logic state 1520. In the SSC detection state 1504, the finite state machine 1410 may activate the oscillator circuit in the clock generator 1406 and other circuits that have been powered down or inactivated in the idle state 1502. The finite state machine 1410 may determine that SDATA 1420 has transitioned to a high logic state based on signaling received from the state monitoring circuit 1402. The receiver circuit 1400 remains in the SSC detection state 1504 while SDATA 1420 remains in the high logic state 1524. The finite state machine 1410 may initialize and monitor the SSC timer 1424*a* to determine the next state for the receiver circuit 1400. In one example, the SSC timer 1424*a* is halted when SDATA 1420 transitions to an inactive, low logic state, thereby terminating a pulse on SDATA 1420. The time value maintained by the SSC timer 1424*a* indicates the duration of the pulse. The finite state machine 1410 may determine whether the duration of the pulse corresponds to a valid 2-wire SSC.

In some implementations, the finite state machine 1410 may be configured to recognize a standards defined 2-wire SSC and may treat one or more types of 1-wire SSCs as dummy SSCs. In one example, a valid 2-wire SSC may be indicated by a pulse transmitted while SCLK 1422 is idle with a duration corresponding to the period of the transmitter clock. The receiver circuit 1400 may be configured to ignore certain signaling on SDATA 1420, including when signaling following a 1-wire SSC is transmitted without a clock signal being concurrently transmitted over SCLK 1422. According to one aspect of this disclosure, a 1-wire SSC has a longer duration than a 2-wire SSC and, in at least some implementations, the receiver circuit 1400 may enter an idle state when a 1-wire SSC is detected.

When the finite state machine 1410 determines that the pulse detected on SDATA 1420 has a duration that corresponds to an invalid SSC 1522, the pulse may be ignored and the finite state machine 1410 may cause the receiver circuit 1400 to return to the idle state 1502. When the finite state machine 1410 determines that the pulse detected on SDATA 1420 has a duration that corresponds to a valid 2-wire SSC 1532, the finite state machine 1410 may the cause receiver circuit 1400 to transition to a 2-wire transaction processing state 1512. The receiver circuit 1400 may be configured to receive and decode commands and data in the 2-wire transaction processing state 1534. The finite state machine 1410 may cause the receiver circuit 1400 to return to the idle state 1502 after detecting that the 2-wire transaction is directed to a different device or after the 1-wire transaction is completed 1536.

When the finite state machine 1410 determines that the pulse detected on SDATA 1420 while the receiver circuit is in the SSC detection state 1504 has a duration that corresponds to a valid 1-wire SSC 1526, the finite state machine 1410 may the cause receiver circuit 1400 to transition to a 1-wire transaction state 1506 in which the receiving device 1400 ignores activity on SDATA 1420. In some instances, the receiving device 1400 remains in the 1-wire transaction state 1506 while SCLK 1422 is idle and SDATA 1420 is active as indicated by the absence of clock pulses 1528 on SCLK 1422 and transitions in signaling state on SDATA 1420.

In some implementations, the finite state machine 1410 may initialize the idle timer 1424*c* when the receiver circuit 1400 enters the 1-wire transaction state 1506. In some examples, the idle timer 1424*c* is reset when SCLK 1422 transitions to the high logic state 1524 and is configured to expire when SCLK 1422 and/or SDATA 1420 remain in the low logic state corresponding to a programmable number of cycles of the bus clock signal 1416. In other examples, the idle timer 1424*c* is configured to expire after a duration of time calculated or selected by an application or during system configuration, and the finite state machine 1410 may cause the receiver circuit 1400 to return to the idle state 1502 when the idle timer 1424*c* expires 1530.

Examples of Processing Circuits and Methods

Figure 16:
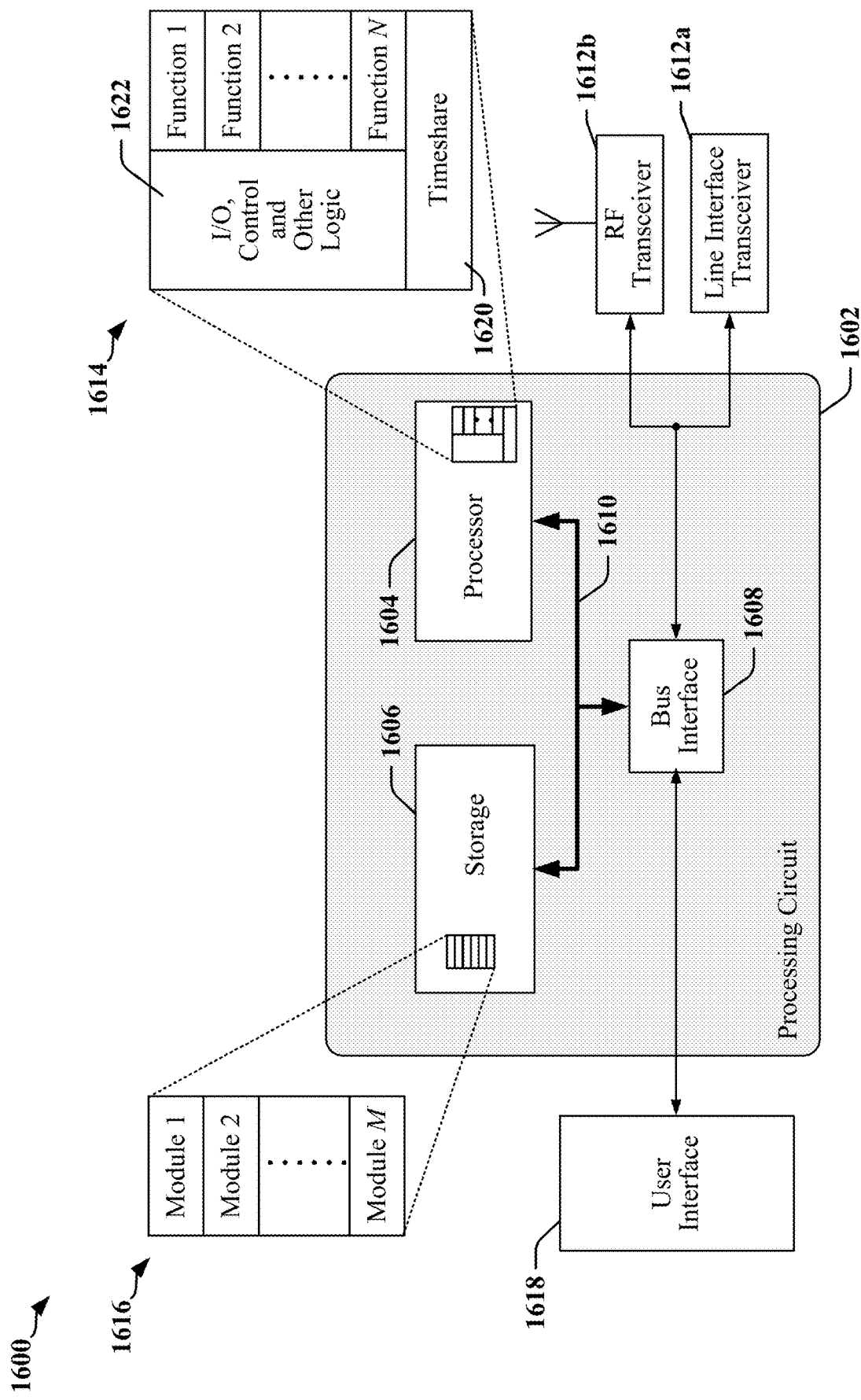
FIG. 16 illustrates one example of an apparatus employing a processing circuit that may be adapted according to certain aspects disclosed herein.

FIG. 16 is a diagram illustrating an example of a hardware implementation for an apparatus 1600. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable storage media and/or processor-readable storage media. The bus 1610 may also link various other circuits such as timing sources, timers, peripherals, voltage regulators, and power management circuits. A bus interface 1608 may provide an interface between the bus 1610 and one or more transceivers 1612a, 1612b. A transceiver 1612a, 1612b may be provided for each networking technology supported by the processing circuit. In some instances, multiple networking technologies may share some or all of the circuitry or processing modules found in a transceiver 1612a, 1612b. Each transceiver 1612a, 1612b provides a means for communicating with various other apparatus over a transmission medium. In one example, a transceiver 1612a may be used to couple the apparatus 1600 to a multi-wire bus. In another example, a transceiver 1612b may be used to connect the apparatus 1600 to a radio access network. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a processor-readable storage medium that may include the illustrated storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external processor-readable storage medium. The external processor-readable storage medium and/or storage 1606 may include a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The processor-readable storage medium and/or storage 1606 may also include, by way of example, a carrier wave, a transmission line, and any other suitable medium for transmitting software and/or instructions that may be accessed and read by a computer. Processor-readable storage medium and/or the storage 1606 may reside in the processing circuit 1602, in the processor 1604, external to the processing circuit 1602, or be distributed across multiple entities including the processing circuit 1602. The processor-readable storage medium and/or storage 1606 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612a, 1612b, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612a, 1612b, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612a, 1612b, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

The processing circuit 1602 may be configured to perform one or more of the functions disclosed herein. For example, the processing circuit 1602 may be configured to operate as a master device coupled to a serial bus. The processing circuit 1602 may be configured to initiate a pulse on a wire coupling the processing circuit 1602 to a subordinate device, present a high impedance to the wire after initiating the pulse and determine whether a subordinate device has terminated the pulse early, indicating a first encoded value. When the subordinate device has not terminated the pulse, processing circuit 1602 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 1602 may be configured to determine the encoded value or may employ a separate PWM decoder.

Figure 17:
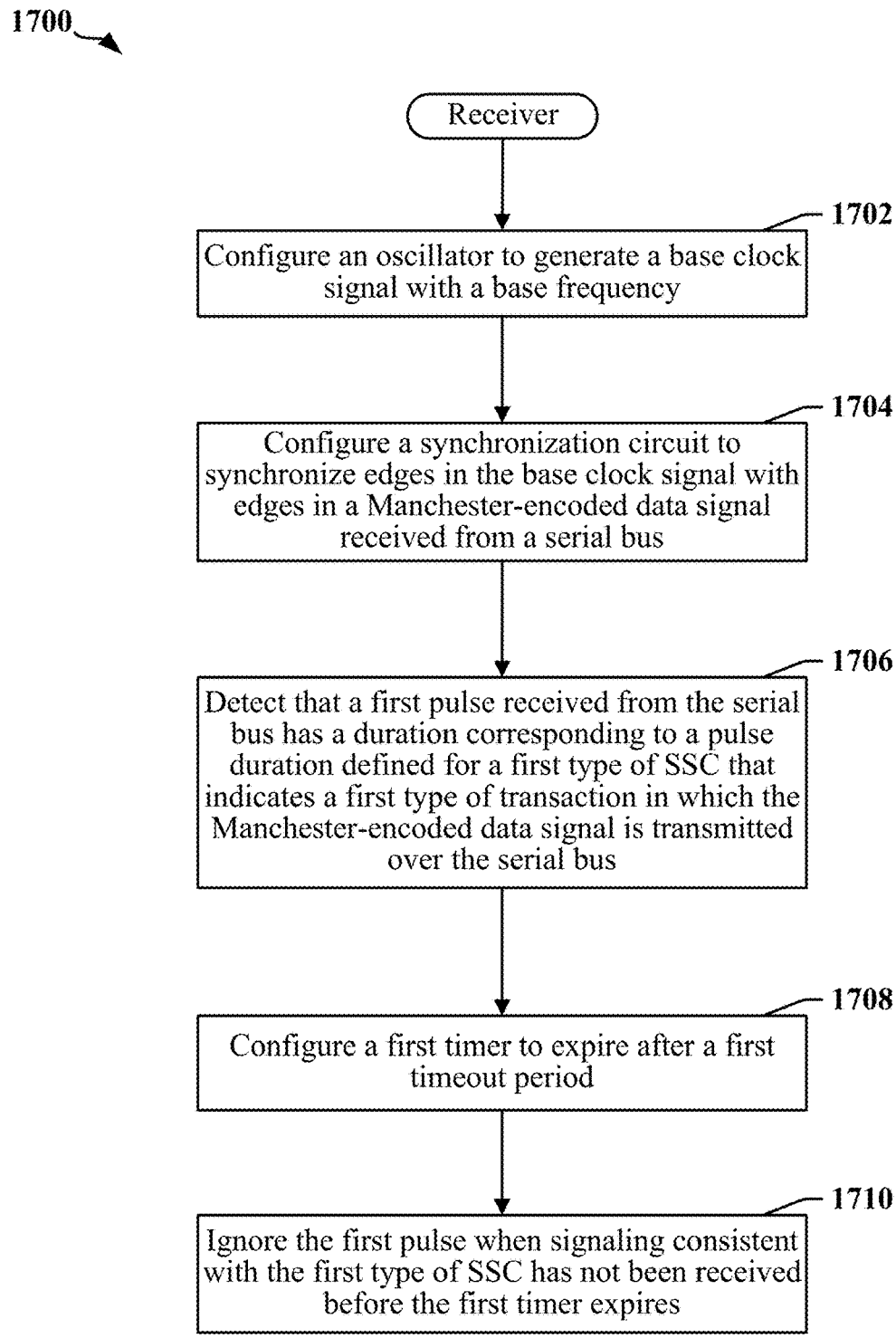
FIG. 17 is a flowchart that illustrates a method for data communication at a host device in accordance with certain aspects disclosed herein.

FIG. 17 is a flowchart 1700 of a method of data communication that may be performed by a receiving circuit in a subordinate device coupled to one wire (SDATA) of a multi-mode serial bus. One or more 1-wire subordinate devices and one or more 2-wire subordinated devices may be coupled to the multi-mode serial bus. A host device may exchange Manchester-encoded data with 1-wire subordinate devices. The host device may transmit Manchester-encoded data and commands to the 1-wire subordinate devices over the data line (SDATA) of the multi-mode serial bus.

At block 1702, the receiving circuit may configure an oscillator to generate a base clock signal with a base frequency. At block 1704, the receiving circuit may configure a synchronization circuit to synchronize edges in the base clock signal with edges in a Manchester-encoded data signal received over a serial bus. At block 1706, the receiving circuit may detect that a first pulse received from the serial bus has a duration corresponding to a pulse duration defined for a first type of SSC that indicates a first type of transaction during which the Manchester-encoded data signal is received over the serial bus. At block 1708, the receiving circuit may configure a first timer to expire after a first timeout period. At block 1710, the receiving circuit may ignore the first pulse when signaling consistent with the first type of SSC has not been received before the first timer expires.

In certain implementations, the pulse duration defined for the first type of SSC is greater than a pulse duration defined for a second type of transaction in which data is received over the serial bus in a data signal with a bus clock signal that defines timing of the data signal. The base clock signal may have a frequency that is a multiple of a frequency of the bus clock signal.

In some examples, the signaling consistent with the first type of SSC comprises a synchronization pattern.

In some implementations, ignoring the first pulse includes configuring a second timer to expire after a second timeout period, and causing one or more circuits in a clock generator circuit to enter an idle state when the second timer expires. The second timer may be restarted when a transition in signaling state of the serial bus is detected before the second timer expires.

In certain examples, Manchester-encoded data or command bits may be received over the serial bus after determining that a second pulse received from the serial bus has a duration corresponding to the pulse duration defined for the first type of SSC. It may be determined that an error has occurred during transmission or decoding of the Manchester-encoded data or command bits and a third timer may then be configured to expire after a third timeout period. The receiving circuit may cause one or more circuits in a clock generator circuit to enter an idle state when the third timer expires. The third timer may be restarted when a transition in signaling state of the serial bus is detected before the third timer expires. The Manchester-encoded data or command bits may be received in a datagram configured in accordance with a Radio Frequency Front-End (RFFE) protocol.

Figure 18:
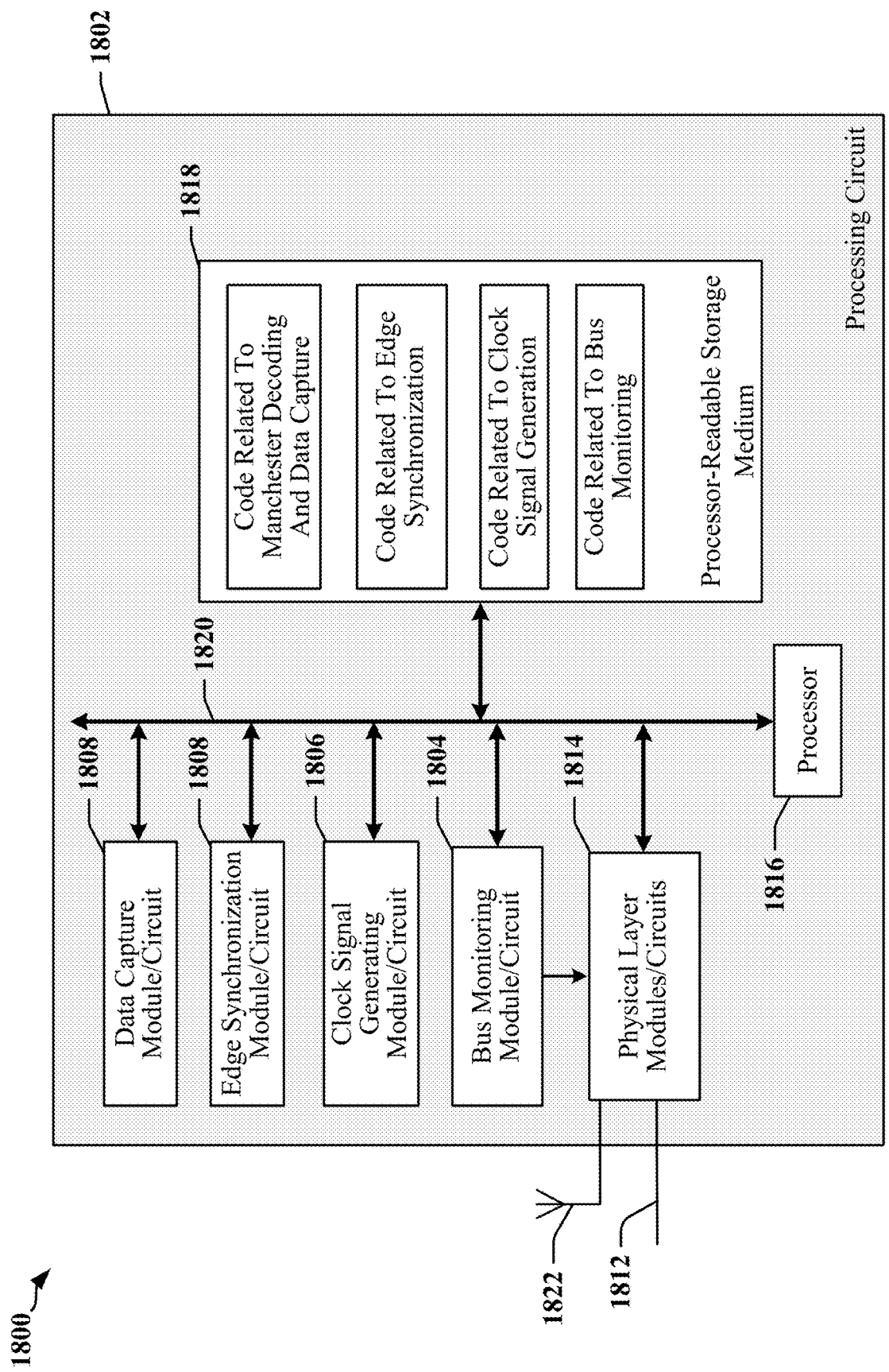
FIG. 18 illustrates an example of a hardware implementation for an apparatus adapted in accordance with certain aspects disclosed herein.

FIG. 18 is a diagram illustrating an example of a hardware implementation for an apparatus 1800 employing a processing circuit 1802. The processing circuit typically has a controller or processor 1816 that may include one or more microprocessors, microcontrollers, digital signal processors, sequencers and/or state machines. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the controller or processor 1816, the modules or circuits 1804, 1806, 1808 and 1810 and the processor-readable storage medium 1818. One or more physical layer circuits and/or modules 1814 may be provided to support communication over a communication link implemented using a multi-wire bus 1812, through an antenna or antenna array 1822 (to a radio access network for example), and so on. The bus 1820 may also link various other circuits such as timing sources, peripherals, voltage regulators, and power management circuits, which are well known in the art, and therefore, will not be described any further.

The processor 1816 is responsible for general processing, including the execution of software, code and/or instructions stored on the processor-readable storage medium 1818. The processor-readable storage medium 1818 may include a non-transitory storage medium. The software, when executed by the processor 1816, causes the processing circuit 1802 to perform the various functions described herein, and for any particular apparatus. The processor-readable storage medium 1818 may be used for storing data that is manipulated by the processor 1816 when executing software. The processing circuit 1802 further includes at least one of the modules 1804, 1806, 1808 and 1810. The modules 1804, 1806, 1808 and 1810 may be software modules running in the processor 1816, resident/stored in the processor-readable storage medium 1818, one or more hardware modules coupled to the processor 1816, or some combination thereof. The modules 1804, 1806, 1808 and

1810 may include microcontroller instructions, state machine configuration parameters, or some combination thereof.

In one configuration, the apparatus 1800 includes modules and/or circuits 1804 adapted to monitor a one-wire bus for activity, inactivity and control signaling. The apparatus 1800 further includes modules and/or circuits 1806 adapted to generate one or more internal clock signals to be used for decoding a signal received over the one-wire bus. The apparatus 1800 further includes modules and/or circuits 1808 configured to synchronize an internal clock signal to edges in the signal received over the one-wire bus. The apparatus 1800 further includes modules and/or circuits 1810 adapted to capture and decode data from the signal received over the one-wire bus.

In one example, the apparatus 1800 includes a clock generator circuit configured to generate a base clock signal with a base frequency, a synchronization circuit configured to synchronize edges in the base clock signal with edges in a Manchester-encoded data signal received over a serial bus, and a controller. The controller may be configured to detect that a first pulse received from the serial bus has a duration corresponding to a pulse duration defined for a first type of SSC that indicates a first type of transaction during which the Manchester-encoded data signal is received over the serial bus, configure a first timer to expire after a first timeout period, and ignore the first pulse when signaling consistent with the first type of SSC has not been received before the first timer expires.

In certain implementations, the pulse duration defined for the first type of SSC is greater than a pulse duration defined for a second type of transaction in which data is received over the serial bus in a data signal with a bus clock signal that defines timing of the data signal. The base clock signal may have a frequency that is a multiple of a frequency of the bus clock signal.

In one example, the signaling consistent with the first type of SSC comprises a synchronization pattern.

In some implementations, the controller is configured to ignore the first pulse by configuring a second timer to expire after a second timeout period, and causing one or more circuits in the clock generator circuit to enter an idle state when the second timer expires. The controller may be further configured to restart the second timer when a transition in signaling state of the serial bus is detected before the second timer expires.

In certain implementations, the controller is further configured to receive Manchester-encoded data or command bits over the serial bus after determining that a second pulse received from the serial bus has a duration corresponding to the pulse duration defined for the first type of SSC, determine that an error has occurred during transmission or decoding of the Manchester-encoded data or command bits, configure a third timer to expire after a third timeout period, and cause one or more circuits in the clock generator circuit to enter an idle state when the third timer expires. The controller may be further configured to restart the third timer when a transition in signaling state of the serial bus is detected before the third timer expires. The Manchester-encoded data or command bits are received in a datagram configured in accordance with RFFE protocols.

The processor-readable storage medium 1818 stores code and data. The code may be executed by the processor 1816, a state machine or sequencer. The code, when executed by the processor 1816, causes the processing circuit 1802 to configure an oscillator to generate a base clock signal with a base frequency, configure a synchronization circuit to synchronize edges in the base clock signal with edges in a Manchester-encoded data signal received over a serial bus, detect that a first pulse received from the serial bus has a duration corresponding to a pulse duration defined for a first type of SSC that indicates a first type of transaction during which the Manchester-encoded data signal is received over the serial bus, configure a first timer to expire after a first timeout period, and ignore the first pulse when signaling consistent with the first type of SSC has not been received before the first timer expires.

In some examples, the pulse duration defined for the first type of SSC is greater than a pulse duration defined for a second type of transaction in which data is received over the serial bus in a data signal with a bus clock signal that defines timing of the data signal. The base clock signal has frequency that is a multiple of a frequency of the bus clock signal. In some instances, the signaling consistent with the first type of SSC comprises a synchronization pattern.

In certain examples, the code further causes the processing circuit to ignore the first pulse by configuring a second timer to expire after a second timeout period, and causing one or more circuits in a clock generator circuit to enter an idle state when the second timer expires. The code may further cause the processing circuit to restart the second timer when a transition in signaling state of the serial bus is detected before the second timer expires.

In some examples, the code further causes the processing circuit to receive Manchester-encoded data or command bits over the serial bus after determining that a second pulse received from the serial bus has a duration corresponding to the pulse duration defined for the first type of SSC, determine that an error has occurred during transmission or decoding of the Manchester-encoded data or command bits, configure a third timer to expire after a third timeout period, and cause one or more circuits in a clock generator circuit to enter an idle state when the third timer expires. The code may further cause the processing circuit to restart the third timer when a transition in signaling state of the serial bus is detected before the third timer expires. The Manchester-encoded data or command bits may be received in a datagram configured in accordance with RFFE protocols.

Some implementation examples are described in the following numbered clauses:

1. A receiving circuit, comprising: a clock generator circuit configured to generate a base clock signal with a base frequency; a synchronization circuit configured to synchronize edges in the base clock signal with edges in a Manchester-encoded data signal received over a serial bus; and a controller configured to: detect that a first pulse received from the serial bus has a duration corresponding to a pulse duration defined for a first type of sequence start condition (SSC) that indicates a first type of transaction during which the Manchester-encoded data signal is received over the serial bus; configure a first timer to expire after a first timeout period; and ignore the first pulse when signaling consistent with the first type of SSC has not been received before the first timer expires.

2. The receiving circuit as described in clause 1, wherein the pulse duration defined for the first type of SSC is greater than a pulse duration defined for a second type of transaction in which data is received over the serial bus in a data signal with a bus clock signal that defines timing of the data signal.

3. The receiving circuit as described in clause 2, wherein the base clock signal has a frequency that is a multiple of a frequency of the bus clock signal.

4. The receiving circuit as described in any of clauses 1-3, wherein the signaling consistent with the first type of SSC comprises a synchronization pattern.
5. The receiving circuit as described in any of clauses 1-4, wherein the controller is configured to ignore the first pulse by: configuring a second timer to expire after a second timeout period; and causing one or more circuits in the clock generator circuit to enter an idle state when the second timer expires.
6. The receiving circuit as described in clause 5, wherein the controller is further configured to: restart the second timer when a transition in signaling state of the serial bus is detected before the second timer expires.
7. The receiving circuit as described in any of clauses 1-6, wherein the controller is further configured to: receive Manchester-encoded data or command bits over the serial bus after determining that a second pulse received from the serial bus has a duration corresponding to the pulse duration defined for the first type of SSC; determine that an error has occurred during transmission or decoding of the Manchester-encoded data or command bits; configure a third timer to expire after a third timeout period; and cause one or more circuits in the clock generator circuit to enter an idle state when the third timer expires.
8. The receiving circuit as described in clause 7, wherein the controller is further configured to: restart the third timer when a transition in signaling state of the serial bus is detected before the third timer expires.
9. The receiving circuit as described in clause 7 or clause 8, wherein the Manchester-encoded data or command bits are received in a datagram configured in accordance with a Radio Frequency Front-End (RFFE) protocol.
10. A method of data communication, comprising: configuring an oscillator to generate a base clock signal with a base frequency; configuring a synchronization circuit to synchronize edges in the base clock signal with edges in a Manchester-encoded data signal received over a serial bus; detecting that a first pulse received from the serial bus has a duration corresponding to a pulse duration defined for a first type of sequence start condition (SSC) that indicates a first type of transaction during which the Manchester-encoded data signal is received over the serial bus; configuring a first timer to expire after a first timeout period; and ignoring the first pulse when signaling consistent with the first type of SSC has not been received before the first timer expires.
11. The method as described in clause 10, wherein the pulse duration defined for the first type of SSC is greater than a pulse duration defined for a second type of transaction in which data is received over the serial bus in a data signal with a bus clock signal that defines timing of the data signal.
12. The method as described in clause 11, wherein the base clock signal has a frequency that is a multiple of a frequency of the bus clock signal.
13. The method as described in any of clauses 10-12, wherein the signaling consistent with the first type of SSC comprises a synchronization pattern.
14. The method as described in any of clauses 10-13, wherein ignoring the first pulse comprises: configuring a second timer to expire after a second timeout period; and causing one or more circuits in a clock generator circuit to enter an idle state when the second timer expires.
15. The method as described in clause 14, further comprising: restarting the second timer when a transition in signaling state of the serial bus is detected before the second timer expires.
16. The method as described in any of clauses 10-15, further comprising: receiving Manchester-encoded data or command bits over the serial bus after determining that a second pulse received from the serial bus has a duration corresponding to the pulse duration defined for the first type of SSC; determining that an error has occurred during transmission or decoding of the Manchester-encoded data or command bits; configuring a third timer to expire after a third timeout period; and causing one or more circuits in a clock generator circuit to enter an idle state when the third timer expires.
17. The method as described in clause 16, further comprising: restarting the third timer when a transition in signaling state of the serial bus is detected before the third timer expires.
18. The method as described in clause 16 or clause 17, wherein the Manchester-encoded data or command bits are received in a datagram configured in accordance with a Radio Frequency Front-End (RFFE) protocol.
19. A processor-readable storage medium storing code thereon, the code when executed by a processor in a processing circuit causes the processing circuit to: configure an oscillator to generate a base clock signal with a base frequency; configure a synchronization circuit to synchronize edges in the base clock signal with edges in a Manchester-encoded data signal received over a serial bus; detect that a first pulse received from the serial bus has a duration corresponding to a pulse duration defined for a first type of sequence start condition (SSC) that indicates a first type of transaction during which the Manchester-encoded data signal is received over the serial bus; configure a first timer to expire after a first timeout period; and ignore the first pulse when signaling consistent with the first type of SSC has not been received before the first timer expires.
20. The processor-readable storage medium as described in clause 19, wherein the pulse duration defined for the first type of SSC is greater than a pulse duration defined for a second type of transaction in which data is received over the serial bus in a data signal with a bus clock signal that defines timing of the data signal.
21. The processor-readable storage medium as described in clause 20, wherein the base clock signal has a frequency that is a multiple of a frequency of the bus clock signal.
22. The processor-readable storage medium as described in any of clauses 19-21, wherein the signaling consistent with the first type of SSC comprises a synchronization pattern.
23. The processor-readable storage medium as described in any of clauses 19-22, wherein the code further causes the processing circuit to ignore the first pulse by: configuring a second timer to expire after a second timeout period; and causing one or more circuits in a clock generator circuit to enter an idle state when the second timer expires.
24. The processor-readable storage medium as described in clause 23, wherein the code further causes the processing circuit to: restart the second timer when a transition in signaling state of the serial bus is detected before the second timer expires.

25. The processor-readable storage medium as described in any of clauses 19-24, wherein the code further causes the processing circuit to: receive Manchester-encoded data or command bits over the serial bus after determining that a second pulse received from the serial bus has a duration corresponding to the pulse duration defined for the first type of SSC; determine that an error has occurred during transmission or decoding of the Manchester-encoded data or command bits; configure a third timer to expire after a third timeout period; and cause one or more circuits in a clock generator circuit to enter an idle state when the third timer expires.

26. The processor-readable storage medium as described in clause 25, wherein the code further causes the processing circuit to: restart the third timer when a transition in signaling state of the serial bus is detected before the third timer expires.

27. The processor-readable storage medium as described in clause 25 or clause 26, wherein the Manchester-encoded data or command bits are received in a datagram configured in accordance with a Radio Frequency Front-End (RFFE) protocol.

28. A data communication apparatus, comprising: means for generating a base clock signal with a base frequency; means for synchronizing edges in the base clock signal with edges in a Manchester-encoded data signal received over a serial bus; and means for determining whether a first pulse received from the serial bus indicates a first type of transaction during which the Manchester-encoded data signal is received over the serial bus, wherein the means for determining whether the first pulse indicates the first type of transaction is configured to determine whether the first pulse has a duration corresponding to a pulse duration defined for a first type of sequence start condition (SSC) and is followed in transmission by signaling consistent with the first type of SSC that is received before a first timeout period expires.

29. The data communication apparatus as described in clause 28, further comprising: means for receiving Manchester-encoded data or command bits over the serial bus after determining that a second pulse received from the serial bus has a duration corresponding to the pulse duration defined for the first type of SSC, wherein one or more circuits in a clock generator circuit enter an idle state after a second timeout period when an error is determined to have occurred during transmission or decoding of the Manchester-encoded data or command bits.

30. The data communication apparatus as described in clause 29, wherein the Manchester-encoded data or command bits are received in a datagram configured in accordance with a Radio Frequency Front-End (RFFE) protocol.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A receiving circuit, comprising:
   a clock generator circuit configured to generate a base clock signal with a base frequency;
   a synchronization circuit configured to synchronize edges in the base clock signal with edges in a Manchester-encoded data signal received over a serial bus; and
   a controller configured to:
      detect that a first pulse received from the serial bus has a duration corresponding to a pulse duration defined for a first type of sequence start condition (SSC) that indicates a first type of transaction during which the Manchester-encoded data signal is received over the serial bus;
      configure a first timer to expire after a first timeout period; and
      ignore the first pulse when signaling consistent with the first type of SSC has not been received before the first timer expires.

2. The receiving circuit of claim 1, wherein the pulse duration defined for the first type of SSC is greater than a pulse duration defined for a second type of transaction in which data is received over the serial bus in a data signal with a bus clock signal that defines timing of the data signal.

3. The receiving circuit of claim 2, wherein the base clock signal has a frequency that is a multiple of a frequency of the bus clock signal.

4. The receiving circuit of claim 1, wherein the signaling consistent with the first type of SSC comprises a synchronization pattern.

5. The receiving circuit of claim 1, wherein the controller is configured to ignore the first pulse by:
   configuring a second timer to expire after a second timeout period; and
   causing one or more circuits in the clock generator circuit to enter an idle state when the second timer expires.

6. The receiving circuit of claim 5, wherein the controller is further configured to:
   restart the second timer when a transition in signaling state of the serial bus is detected before the second timer expires.

7. The receiving circuit of claim 1, wherein the controller is further configured to:
   receive Manchester-encoded data or command bits over the serial bus after determining that a second pulse received from the serial bus has a duration corresponding to the pulse duration defined for the first type of SSC;

determine that an error has occurred during transmission or decoding of the Manchester-encoded data or command bits;
configure a third timer to expire after a third timeout period; and
cause one or more circuits in the clock generator circuit to enter an idle state when the third timer expires.

8. The receiving circuit of claim 7, wherein the controller is further configured to:
restart the third timer when a transition in signaling state of the serial bus is detected before the third timer expires.

9. The receiving circuit of claim 7, wherein the Manchester-encoded data or command bits are received in a datagram configured in accordance with a Radio Frequency Front-End (RFFE) protocol.

10. A method of data communication, comprising:
configuring an oscillator to generate a base clock signal with a base frequency;
configuring a synchronization circuit to synchronize edges in the base clock signal with edges in a Manchester-encoded data signal received over a serial bus;
detecting that a first pulse received from the serial bus has a duration corresponding to a pulse duration defined for a first type of sequence start condition (SSC) that indicates a first type of transaction during which the Manchester-encoded data signal is received over the serial bus;
configuring a first timer to expire after a first timeout period; and
ignoring the first pulse when signaling consistent with the first type of SSC has not been received before the first timer expires.

11. The method of claim 10, wherein the pulse duration defined for the first type of SSC is greater than a pulse duration defined for a second type of transaction in which data is received over the serial bus in a data signal with a bus clock signal that defines timing of the data signal.

12. The method of claim 11, wherein the base clock signal has a frequency that is a multiple of a frequency of the bus clock signal.

13. The method of claim 10, wherein the signaling consistent with the first type of SSC comprises a synchronization pattern.

14. The method of claim 10, wherein ignoring the first pulse comprises:
configuring a second timer to expire after a second timeout period; and
causing one or more circuits in a clock generator circuit to enter an idle state when the second timer expires.

15. The method of claim 14, further comprising:
restarting the second timer when a transition in signaling state of the serial bus is detected before the second timer expires.

16. The method of claim 10, further comprising:
receiving Manchester-encoded data or command bits over the serial bus after determining that a second pulse received from the serial bus has a duration corresponding to the pulse duration defined for the first type of SSC;
determining that an error has occurred during transmission or decoding of the Manchester-encoded data or command bits;
configuring a third timer to expire after a third timeout period; and
causing one or more circuits in a clock generator circuit to enter an idle state when the third timer expires.

17. The method of claim 16, further comprising:
restarting the third timer when a transition in signaling state of the serial bus is detected before the third timer expires.

18. The method of claim 16, wherein the Manchester-encoded data or command bits are received in a datagram configured in accordance with a Radio Frequency Front-End (RFFE) protocol.

19. A non-transitory processor-readable storage medium storing code thereon, the code when executed by a processor in a processing circuit causes the processing circuit to:
configure an oscillator to generate a base clock signal with a base frequency;
configure a synchronization circuit to synchronize edges in the base clock signal with edges in a Manchester-encoded data signal received over a serial bus;
detect that a first pulse received from the serial bus has a duration corresponding to a pulse duration defined for a first type of sequence start condition (SSC) that indicates a first type of transaction during which the Manchester-encoded data signal is received over the serial bus;
configure a first timer to expire after a first timeout period; and
ignore the first pulse when signaling consistent with the first type of SSC has not been received before the first timer expires.

20. The non-transitory processor-readable storage medium of claim 19, wherein the pulse duration defined for the first type of SSC is greater than a pulse duration defined for a second type of transaction in which data is received over the serial bus in a data signal with a bus clock signal that defines timing of the data signal.

21. The non-transitory processor-readable storage medium of claim 20, wherein the base clock signal has a frequency that is a multiple of a frequency of the bus clock signal.

22. The non-transitory processor-readable storage medium of claim 19, wherein the signaling consistent with the first type of SSC comprises a synchronization pattern.

23. The non-transitory processor-readable storage medium of claim 19, wherein the code further causes the processing circuit to ignore the first pulse by:
configuring a second timer to expire after a second timeout period; and
causing one or more circuits in a clock generator circuit to enter an idle state when the second timer expires.

24. The non-transitory processor-readable storage medium of claim 23, wherein the code further causes the processing circuit to:
restart the second timer when a transition in signaling state of the serial bus is detected before the second timer expires.

25. The non-transitory processor-readable storage medium of claim 19, wherein the code further causes the processing circuit to:
receive Manchester-encoded data or command bits over the serial bus after determining that a second pulse received from the serial bus has a duration corresponding to the pulse duration defined for the first type of SSC;
determine that an error has occurred during transmission or decoding of the Manchester-encoded data or command bits;
configure a third timer to expire after a third timeout period; and cause one or more circuits in a clock generator circuit to enter an idle state when the third timer expires.

26. The non-transitory processor-readable storage medium of claim 25, wherein the code further causes the processing circuit to:
restart the third timer when a transition in signaling state of the serial bus is detected before the third timer expires.

27. The non-transitory processor-readable storage medium of claim 25, wherein the Manchester-encoded data or command bits are received in a datagram configured in accordance with a Radio Frequency Front-End (RFFE) protocol.

28. A data communication apparatus, comprising:
means for generating a base clock signal with a base frequency;
means for synchronizing edges in the base clock signal with edges in a Manchester-encoded data signal received over a serial bus; and
means for determining whether a first pulse received from the serial bus indicates a first type of transaction during which the Manchester-encoded data signal is received over the serial bus, wherein the means for determining whether the first pulse indicates the first type of transaction is configured to determine whether the first pulse has a duration corresponding to a pulse duration defined for a first type of sequence start condition (SSC) and is followed in transmission by signaling consistent with the first type of SSC that is received before a first timeout period expires.

29. The data communication apparatus of claim 28, further comprising:
means for receiving Manchester-encoded data or command bits over the serial bus after determining that a second pulse received from the serial bus has a duration corresponding to the pulse duration defined for the first type of SSC,
wherein one or more circuits in a clock generator circuit enter an idle state after a second timeout period when an error is determined to have occurred during transmission or decoding of the Manchester-encoded data or command bits.

30. The data communication apparatus of claim 29, wherein the Manchester-encoded data or command bits are received in a datagram configured in accordance with a Radio Frequency Front-End (RFFE) protocol.

* * * * *